(12) United States Patent
Gross et al.

(10) Patent No.: US 11,799,316 B2
(45) Date of Patent: Oct. 24, 2023

(54) FUEL CELL SYSTEM FOR INFORMATION TECHNOLOGY LOADS

(71) Applicant: BLOOM ENERGY CORPORATION, San Jose, CA (US)

(72) Inventors: Peter Gross, Sunnyvale, CA (US); Carl Cottuli, Franklin, MA (US); Arne Ballantine, Palo Alto, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 354 days.

(21) Appl. No.: 17/002,393

(22) Filed: Aug. 25, 2020

(65) Prior Publication Data

US 2020/0389043 A1 Dec. 10, 2020

Related U.S. Application Data

(63) Continuation of application No. 15/441,846, filed on Feb. 24, 2017, now Pat. No. 10,797,514.
(Continued)

(51) Int. Cl.
| | |
|---|---|
| H02J 9/06 | (2006.01) |
| H01M 8/0668 | (2016.01) |
| H01M 8/0612 | (2016.01) |
| G06F 1/26 | (2006.01) |
| G06F 1/30 | (2006.01) |
| H02J 1/10 | (2006.01) |
| H02M 7/66 | (2006.01) |
| C10L 3/10 | (2006.01) |

(52) U.S. Cl.
CPC .............. *H02J 9/061* (2013.01); *G06F 1/263* (2013.01); *G06F 1/30* (2013.01); *H01M 8/0612* (2013.01); *H01M 8/0668* (2013.01); *H02J 1/102* (2013.01); *C10L 3/104* (2013.01); *H01M 2250/10* (2013.01); *H02J 2300/30* (2020.01); *H02M 7/66* (2013.01); *Y02B 90/10* (2013.01)

(58) Field of Classification Search
CPC ........ H02J 9/061; H02J 1/102; H02J 2300/30; G06F 1/263; G06F 1/30; H01M 8/0612; H01M 8/0668; H01M 2250/10; C10L 3/104; H02M 7/66; Y02B 90/14
See application file for complete search history.

(56) References Cited

U.S. PATENT DOCUMENTS

| 7,713,649 B2 | 5/2010 | Hickey et al. |
| 8,232,676 B2 | 7/2012 | Gurunathan et al. |

(Continued)

*Primary Examiner* — Carlos Amaya
(74) *Attorney, Agent, or Firm* — THE MARBURY LAW GROUP PLLC

(57) ABSTRACT

A fuel cell system having a power module including at least one fuel cell segment, an input output module including at least one inverter, a rectifier, and an electric distribution module having at least a first electrical connector and a second electrical connector. The at least one fuel cell segment may be electrically connected to the at least one inverter and may be electrically connected to an information technology (IT) load via a split bus. The at least one inverter may be electrically connected to an alternating current (AC) source via the first electrical connector of the electric distribution module. The rectifier may be electrically connected to the AC source via the second electrical connector of the electric distribution module and may be electrically connected to the IT load via the split bus.

14 Claims, 16 Drawing Sheets

Related U.S. Application Data

(60) Provisional application No. 62/299,696, filed on Feb. 25, 2016.

(56) References Cited

U.S. PATENT DOCUMENTS

| | | |
|---|---|---|
| 8,535,836 B2 | 9/2013 | Ballantine et al. |
| 10,797,514 B2 * | 10/2020 | Gross ........................ G06F 1/30 |
| 2005/0271914 A1 | 12/2005 | Farooque et al. |
| 2009/0256422 A1 | 10/2009 | Fox et al. |
| 2010/0028734 A1 | 2/2010 | Ballantine et al. |
| 2011/0081586 A1 | 4/2011 | McAlister |
| 2012/0326504 A1 | 12/2012 | Ballantine et al. |
| 2014/0009003 A1 | 1/2014 | Ballantine et al. |
| 2014/0132073 A1 | 5/2014 | Satake |
| 2014/0265585 A1 | 9/2014 | Della Sera et al. |
| 2015/0298566 A1 | 10/2015 | Srinivasan et al. |
| 2017/0157557 A1 | 6/2017 | Ding et al. |
| 2017/0250568 A1 | 8/2017 | Gross et al. |
| 2017/0317501 A1 | 11/2017 | Moriyama |

\* cited by examiner

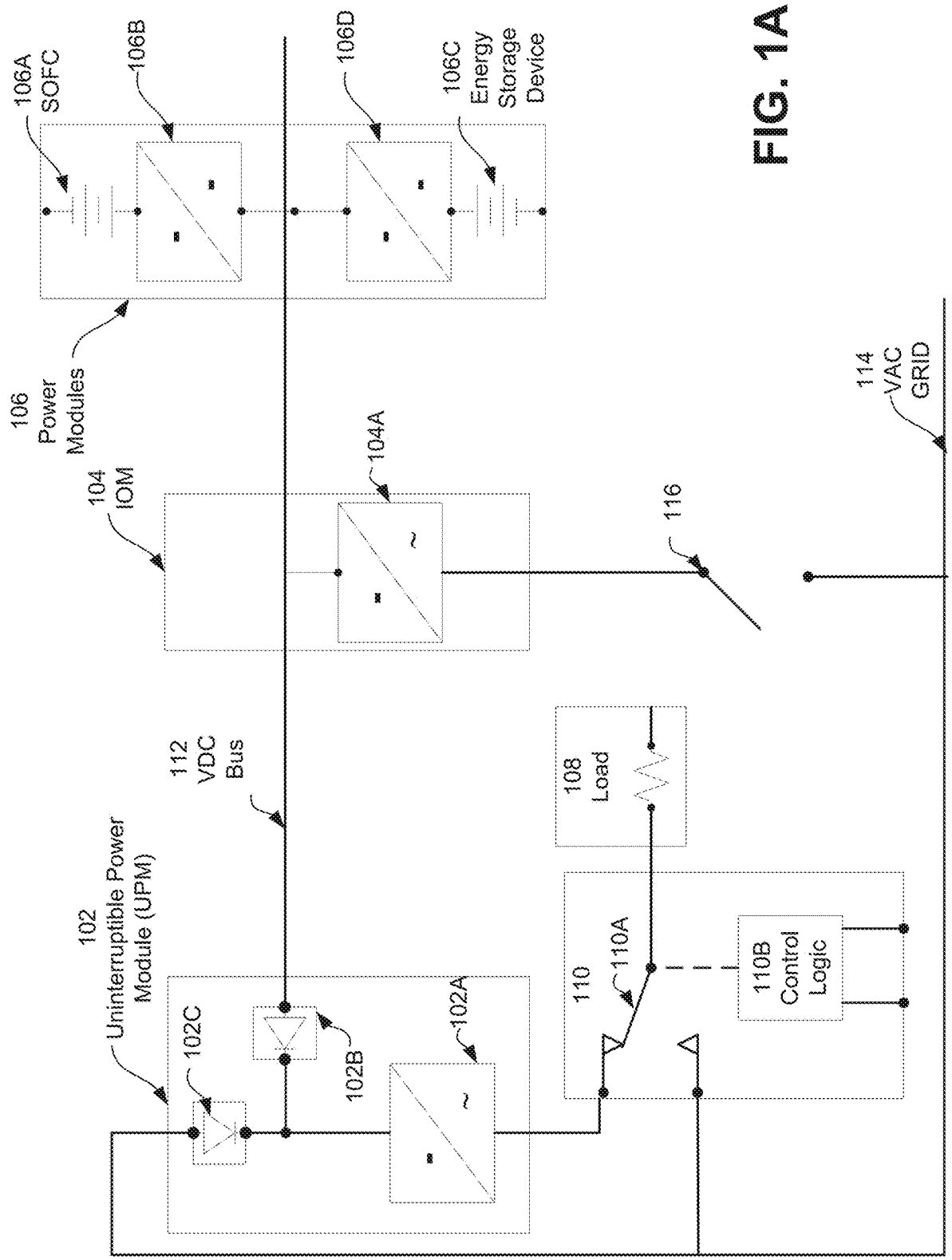

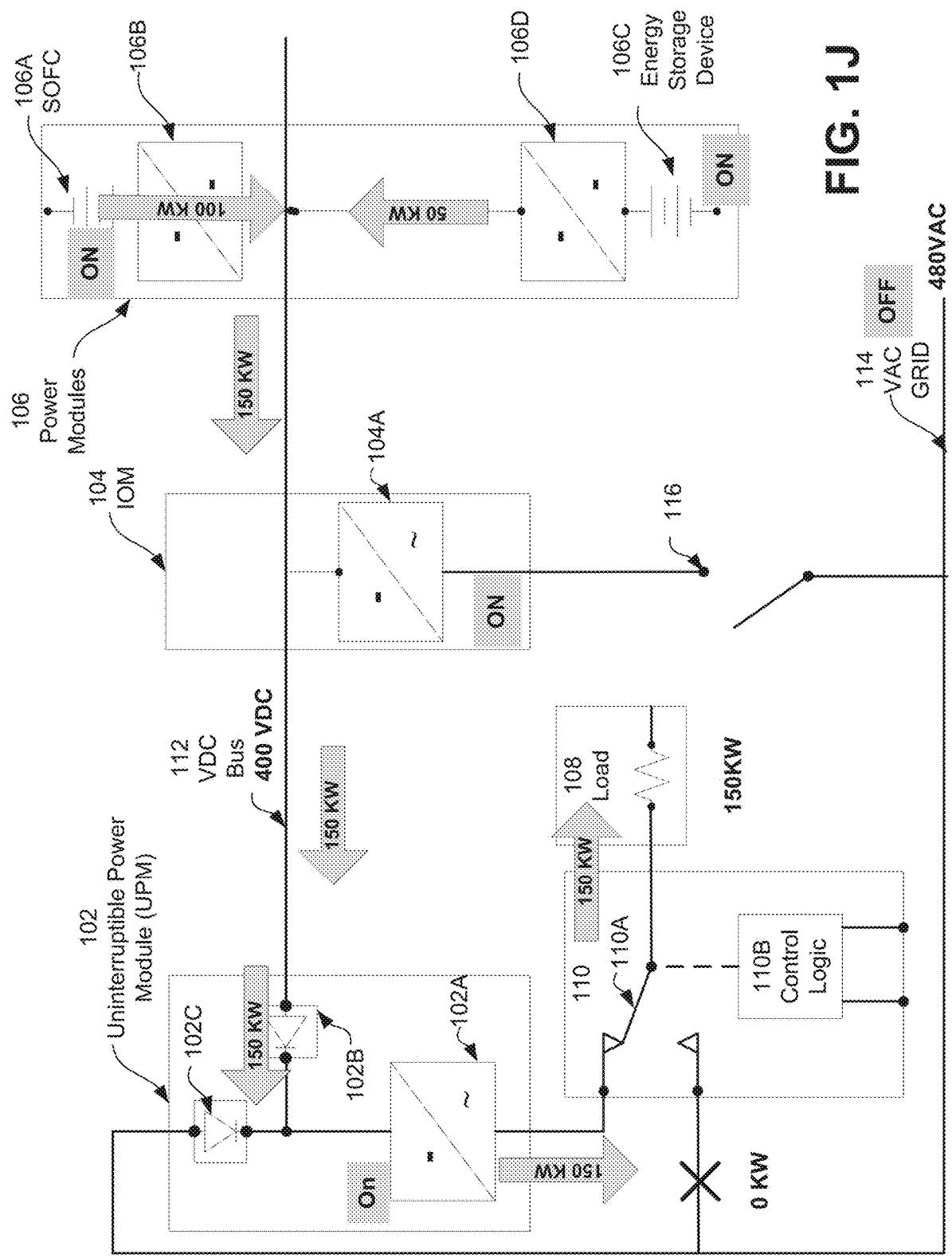

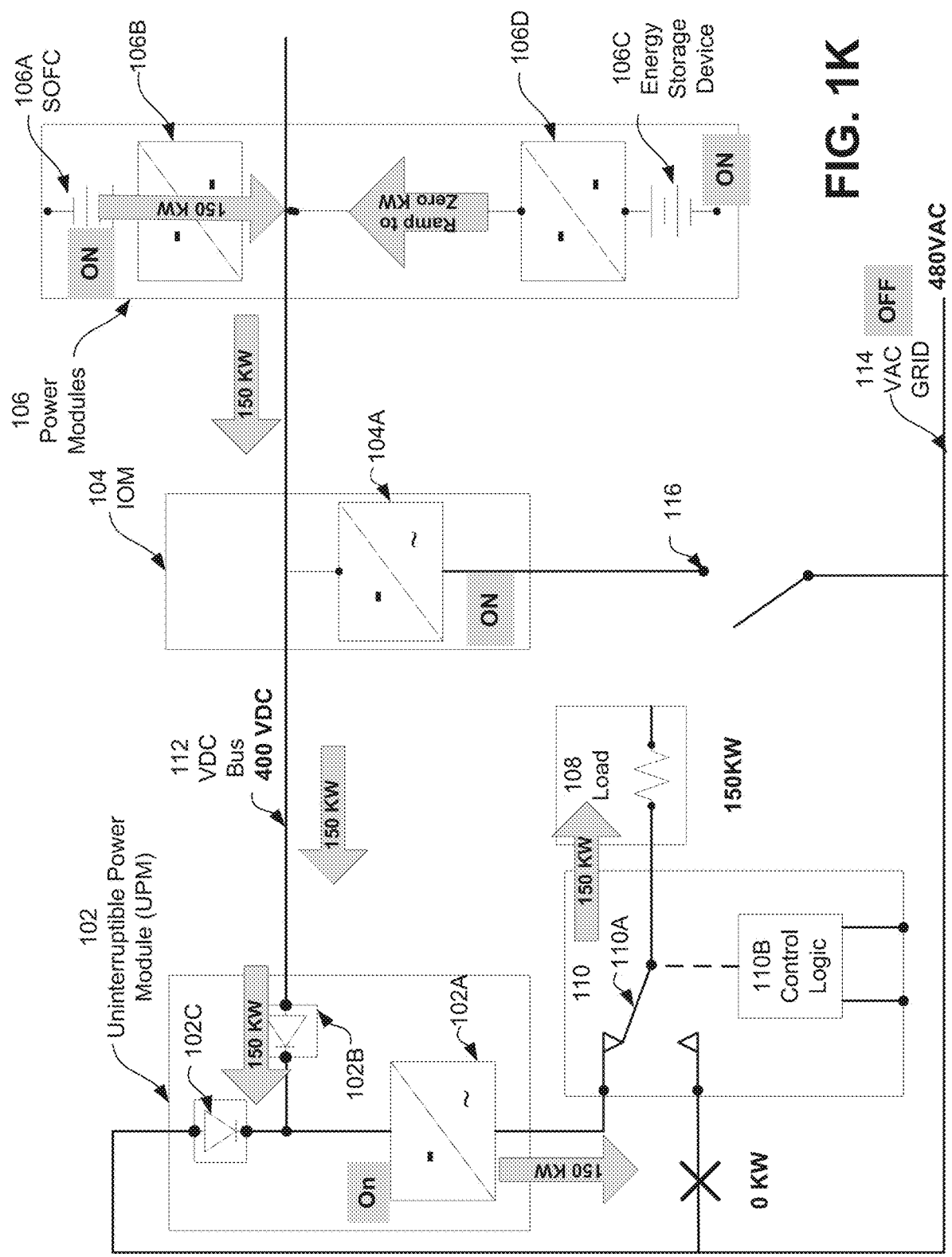

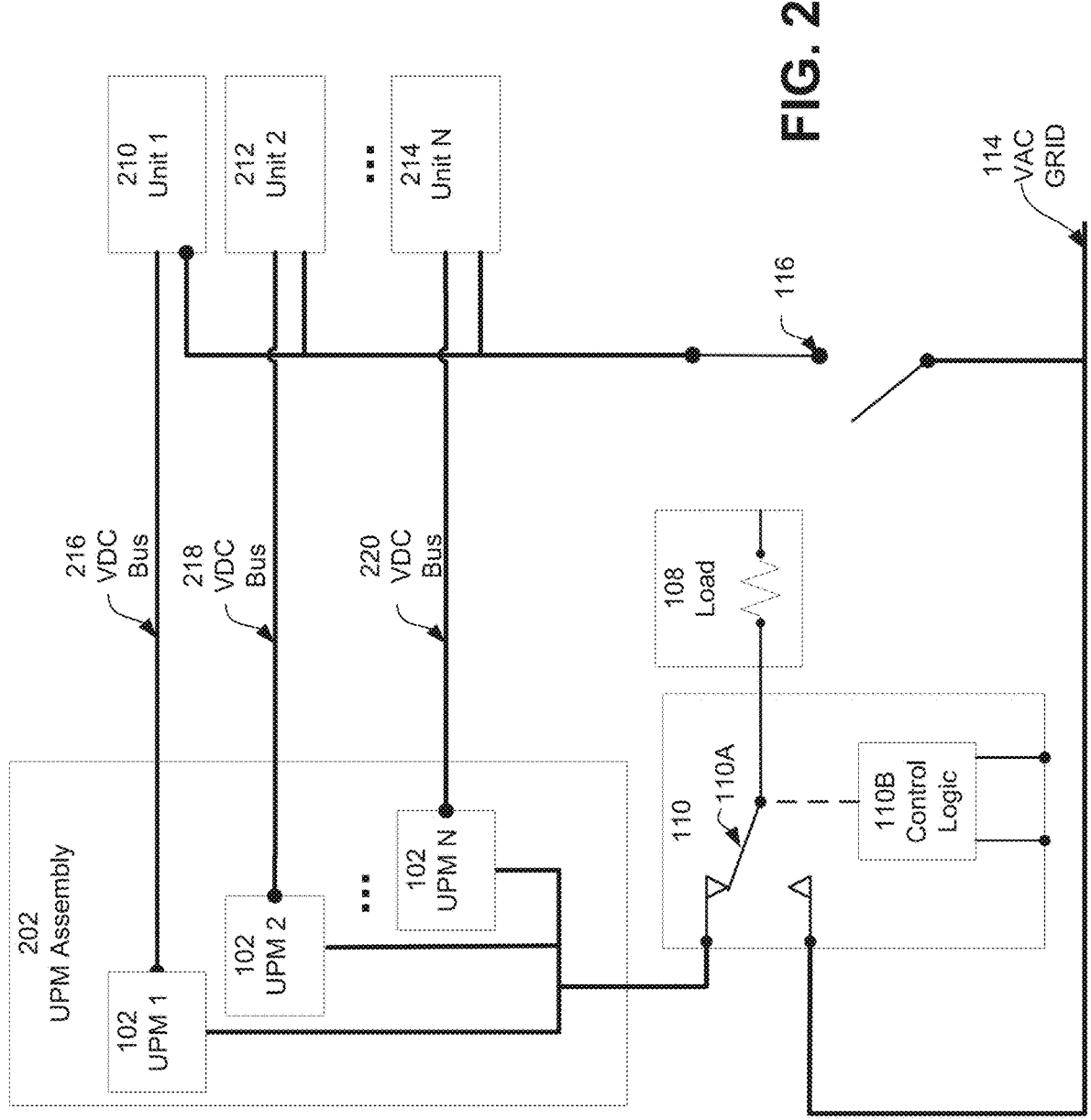

FUEL CELL SYSTEM FOR INFORMATION TECHNOLOGY LOADS

RELATED APPLICATIONS

This application claims the benefit of priority to U.S. Provisional Application No. 62/299,696 entitled "Fuel Cell System For Information Technology Loads" filed Feb. 26, 2016, and U.S. Non-Provisional application Ser. No. 15/441,846, filed Feb. 24, 2017, the entire contents of which are hereby incorporated by reference for all purposes.

BACKGROUND

Electrical power systems can be used to provide electrical power to one more loads such as buildings, appliances, lights, tools, air conditioners, heating units, factory equipment and machinery, power storage units, computers, security systems, etc. The electricity used to power loads is often received from an electrical grid. However, the electricity for loads may also be provided through alternative power sources such as fuel cells, solar arrays, wind turbines, thermo-electric devices, batteries, etc. The alternative power sources can be used in conjunction with the electrical grid, and a plurality of alternative power sources may be combined in a single electrical power system. Alternative power sources are generally combined after conversion of their DC output into an alternating current (AC). As a result, synchronization of alternative power sources is required.

SUMMARY

The various embodiments provide a fuel cell system, having a power module including at least one fuel cell segment, an input output module including at least one inverter, a rectifier, and an electric distribution module including at least a first electrical connector and a second electrical connector, in which the at least one fuel cell segment is electrically connected to the at least one inverter and is electrically connected to an information technology (IT) load via a split bus, the at least one inverter is electrically connected to an alternating current (AC) source via the first electrical connector of the electric distribution module, the rectifier is electrically connected to the AC source via the second electrical connector of the electric distribution module and is electrically connected to the IT load via the split bus.

The various embodiments provide a fuel cell system, having a power module including at least one fuel cell segment, an input output module having at least one inverter, a transformer, and an electric distribution module having at least a first electrical connector and a second electrical connector, in which the at least one fuel cell segment is electrically connected to the at least one inverter and is electrically connected to an information technology (IT) load via a first bus, the at least one inverter is electrically connected to an alternating current (AC) source via the first electrical connector of the electric distribution module, and the transformer is electrically connected to the AC source via the second electrical connector of the electric distribution module and electrically connected to the IT load via a second bus.

The various embodiments provide a method of operating a fuel cell system having a plurality of fuel cell segments and $CO_2$ separator, the method including receiving a hydrocarbon fuel from a natural gas well or an algae farm at the fuel cell system, generating power using the hydrocarbon fuel, separating $CO_2$ from a fuel exhaust of the fuel cell segments using the $CO_2$ separator, and providing the separated $CO_2$ to the natural gas well or the algae farm.

DESCRIPTION OF THE DRAWINGS

FIG. 1A is a block diagram illustrating a system according to an embodiment.

FIGS. 1B to 1K illustrate the system of FIG. 1A in various modes of operation.

FIGS. 2 and 3 are block diagrams illustrating a DC microgrid according to an embodiment.

DETAILED DESCRIPTION

Figure 1B:
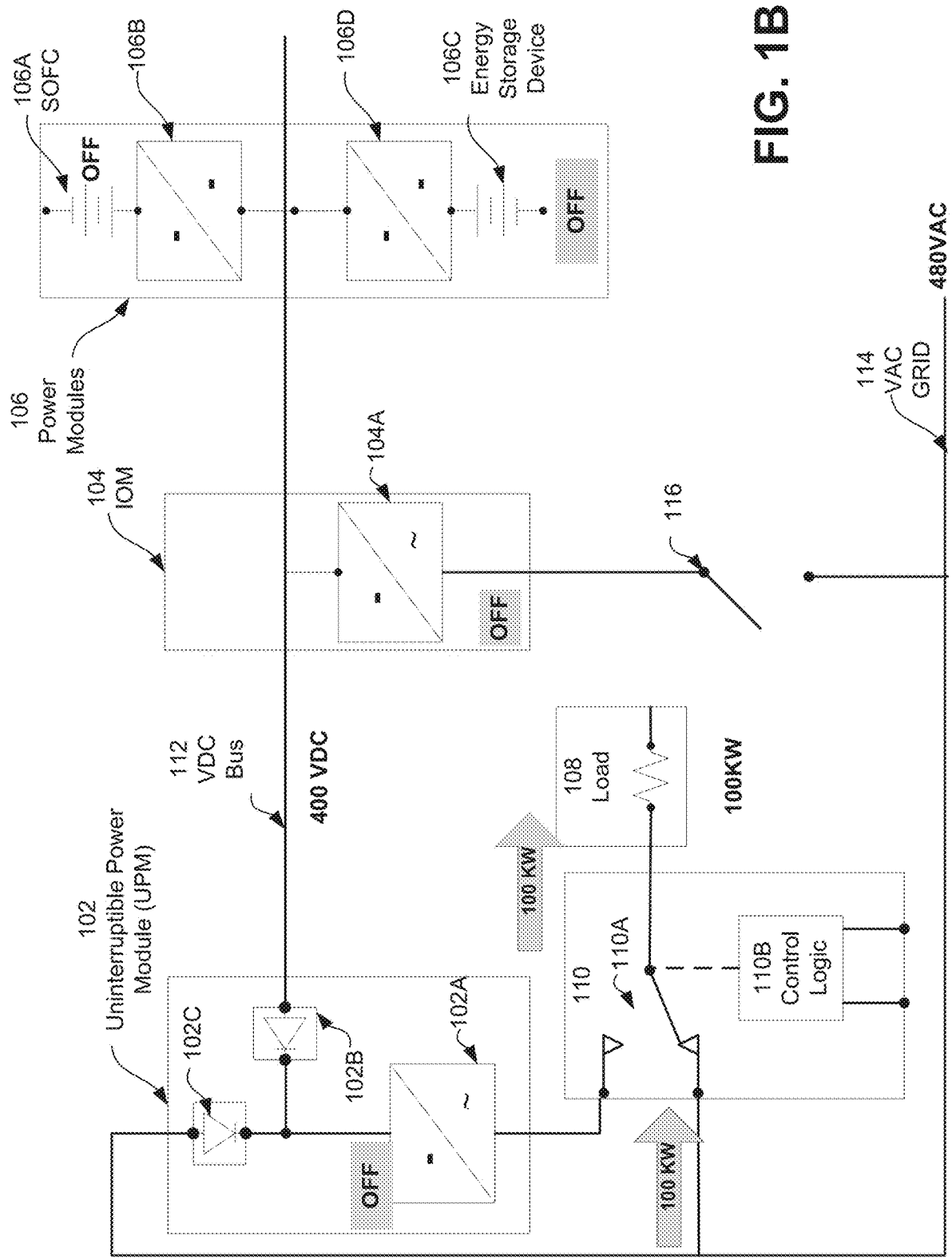

Referring to FIG. 1, a fuel cell system according to an embodiment includes a UPM 102, an input/output module (TOM) 104 and one or more power modules 106. The power module 106 comprises a first housing, the IOM 104 comprises a second housing which is separate from the first housing, and the uninterruptible power module 102 comprises a third housing which is separate from the first and the second housings. If there is more than one power module 106, for example six to ten modules 106, then each power module may comprise its own housing. Each housing may comprise a cabinet or another type of full or partial enclosure, for example the cabinet described in U.S. application Ser. No. 12/458,355, filed on Jul. 8, 2009 and incorporated herein by reference in its entirety. The modules may be arranged in one or more rows or in other configurations.

The UPM 102 includes at least one DC/AC inverter 102A. If desired, an array of inverters may be used. Any suitable inverter known in the art may be used. The UPM 102 optionally contains an input rectifier, such as an input diode 102B which connects to the output of a DC bus 112 from the power module(s) 106 and to the input of the at least one inverter 102A. The UPM also optionally contains a boost PFC rectifier 102C which connects to the output the electric grid 114, such as a utility grid, and to the input of the at least one inverter 102A.

The TOM 104 may comprise one or more power conditioning components. The power conditioning components may include components for converting DC power to AC power, such as a DC/AC inverter 104A (e.g., a DC/AC inverter described in U.S. Pat. No. 7,705,490, incorporated herein by reference in its entirety), electrical connectors for AC power output to the grid, circuits for managing electrical transients, a system controller (e.g., a computer or dedicated control logic device or circuit), etc. The power conditioning components may be designed to convert DC power from the fuel cell modules to different AC voltages and frequencies. Designs for 208V, 60 Hz; 480V, 60 Hz; 415V, 50 Hz and other common voltages and frequencies may be provided.

Each power module 106 cabinet is configured to house one or more hot boxes. Each hot box contains one or more stacks or columns of fuel cells 106A (generally referred to as "segments"), such as one or more stacks or columns of solid oxide fuel cells having a ceramic oxide electrolyte separated by conductive interconnect plates. Other fuel cell types, such as PEM, molten carbonate, phosphoric acid, etc. may also be used.

Fuel cells are often combined into units called "stacks" in which the fuel cells are electrically connected in series and separated by electrically conductive interconnects, such as gas separator plates which function as interconnects. A fuel cell stack may contain conductive end plates on its ends. A generalization of a fuel cell stack is the so-called fuel cell segment or column, which can contain one or more fuel cell stacks connected in series (e.g., where the end plate of one stack is connected electrically to an end plate of the next stack). A fuel cell segment or column may contain electrical leads which output the direct current from the segment or column to a power conditioning system. A fuel cell system can include one or more fuel cell columns, each of which may contain one or more fuel cell stacks, such as solid oxide fuel cell stacks.

The fuel cell stacks may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

Power modules may also comprise other generators of direct current, such as solar cell, wind turbine, geothermal or hydroelectric power generators.

The segment(s) 106A of fuel cells may be connected to the DC bus, 112 such as a split DC bus, by one or more DC/DC converters 106B located in module 106. The DC/DC converters 106B may be located in the TOM 104 instead of the power module 106.

The power module(s) 106 may also optionally include an energy storage device 106C, such as a bank of supercapacitors or batteries. Device 106C may also be connected to the DC bus 112 using one or more DC/DC converters 106D.

The UPM 102 is connected to an input/output module (TOM) 104 via the DC bus 112. The DC bus receives power from power modules 106.

The fuel cell system and the grid 114 are electrically connected to a load 108 using a control logic unit 110. The load may comprise any suitable load which uses AC power, such as one or more buildings, appliances, lights, tools, air conditioners, heating units, factory equipment and machinery, power storage units, computers, security systems, etc. The control logic unit includes a switch 110A and control logic 110B, such as a computer, a logic circuit or a dedicated controller device. The switch may be an electrical switch (e.g., a switching circuit) or an electromechanical switch, such as a relay.

Control logic 110B routes power to the load 108 either from the UPM 102 or from the grid 114 using switch 110A. The at least one fuel cell segment 106A and storage device 106C from module 106 are electrically connected in parallel to the at least one first inverter 104A in IOM and to the at least one second inverter 102A in the UPM 102. The at least one first inverter 104A is electrically connected to the load 108 through the electrical grid 114 using switch 110A in the first position. In contrast to the circuit shown in U.S. Pat. No. 8,232,676 (filed May 2, 2008 and entitled "Uninterruptible Fuel Cell System"), the grid 114 in FIG. 1A is directly connected to the load 108 through the control logic unit 110 without passing through a bidirectional inverter. The at least one second inverter 102A is electrically connected to the load 108 with the switch 110A in the second position without using the electrical grid 114 (i.e., the output of the fuel cell segment 106A does not have to pass through the grid 114 to reach the load 108).

Thus, the control logic 110B selects whether to provide power to the load from the electrical grid 114 (or from the fuel cell segment 106A through the grid) or through the at least one second inverter 102A. The control logic 110B may determine a state of the power modules and select a source to power the load 108 based on the state of the power modules, as described below.

A second switch 116 controls the electrical connection between the IOM 104 and the grid 114. Switch 116 may controlled by the control logic 110B or by another system controller.

By way of illustration and not by way of limitation, the system contains the following electrical paths:

A path to the load 108 from the AC grid 114.

A path from the AC grid 114 through the IOM 104 to storage elements 106C of power modules 106 (for example, supercapacitors or batteries).

A path from the storage elements 106C of the power modules 106, over the DC bus 112 to the IOM 104 and the UPM 102 in parallel. The DC bus delivers DC to the inverter in the UPM 102. The inverter 102A in the UPM 102 or inverter 104A in IOM 104 delivers AC power to the load 108 depending on the position of the switch 110A.

A path from the power modules 106 (which may include power from the fuel cell segment(s) 106A and/or the storage elements 106C of the power modules 106), over the DC bus 112 to the IOM 104 and the UPM 102. The DC bus delivers DC voltage to the inverter in the UPM 102. The inverter 102A in the UPM 102 delivers AC power to the load 108. Power in excess of the power required by the load 108 is delivered to the AC grid through an inverter 104A in the IOM 104. The amount of power that is delivered to the AC grid 114 will vary according the demands of the load 108. If the amount of power required by the load 108 exceeds the power provided by the power modules 106, the additional power demand may be supplied by the AC grid 114 directly to the load 108 through switch 110A in the first position or to the UPM 102 with the switch 110A in the second position. The grid power is rectified in rectifier 102C in UPM 102 and provided to the inverter 102A in the UPM 102 and converted back to AC for powering the load 108.

FIGS. 1B-1K illustrate various modes of operation of the system shown in FIG. 1A. While the embodiments described below illustrate a load 108 which requires 100 kW of power and the fuel cell segment(s) 106A which output 200 kW of power in steady state, these values are provided for illustration only and any other suitable load and power output values may be used.

FIG. 1B illustrates the system operation during the installation of the system and/or during a period when the load 108 receives power from the grid 114. As shown in this figure, the fuel cell segment(s) 106A and the energy storage device 106C are in the OFF state, the IOM 104 inverter 104A and the UPM inverter 102A are both in the OFF state and the second switch 116 is open such that there is no electrical communication between the TOM and the grid. The control logic switch 110A is in the first position to provide power from the grid 114 to the load 108 through the control logic module 110. As shown in the figure, 100 kW of power is provided from the grid to the load through the control logic module.

Figure 1C:
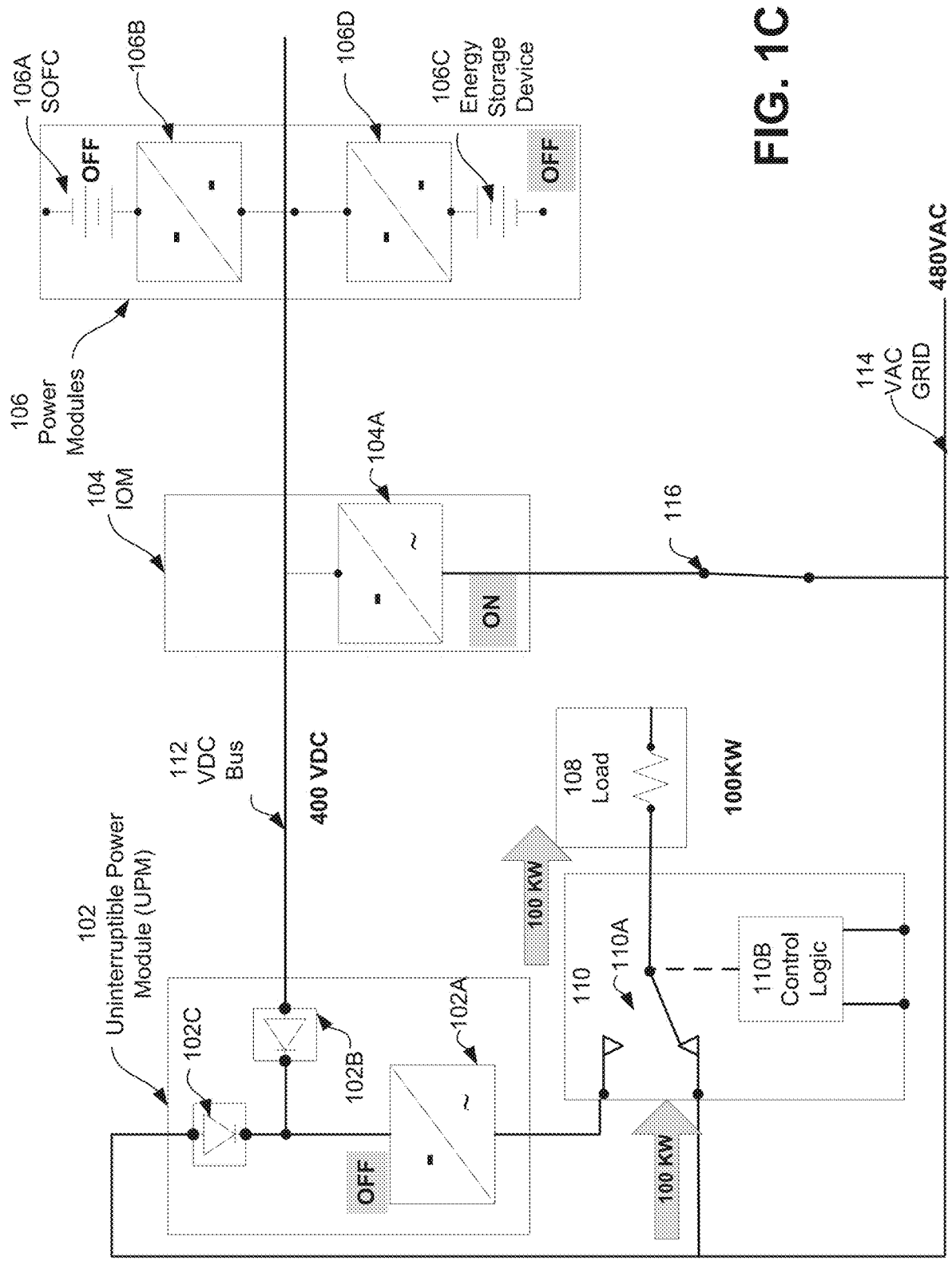

FIG. 1C illustrates the system operation during TOM start-up and charging of the energy storage device (e.g., bank of supercapacitors) 106C from the grid 114 while the load 108 receives power from the grid 114. As shown in this figure, the fuel cell segment(s) 106A are in the OFF state while the energy storage device 106C is in the ON state. The IOM 104 bi-directional inverter 104A is in the ON state and the UPM inverter 102A is in the OFF state. The second switch 116 is closed such that there is electrical communication between the TOM and the grid to provide power from the grid 114 to the energy storage device 106C through the IOM 104 inverter 104A and the DC bus 112. The control logic switch 110A is in the first position to provide power from the grid 114 to the load 108 through the control logic module 110. As shown in the figure, 100 kW of power is provided from the grid to the load through the control logic module.

Figure 1D:
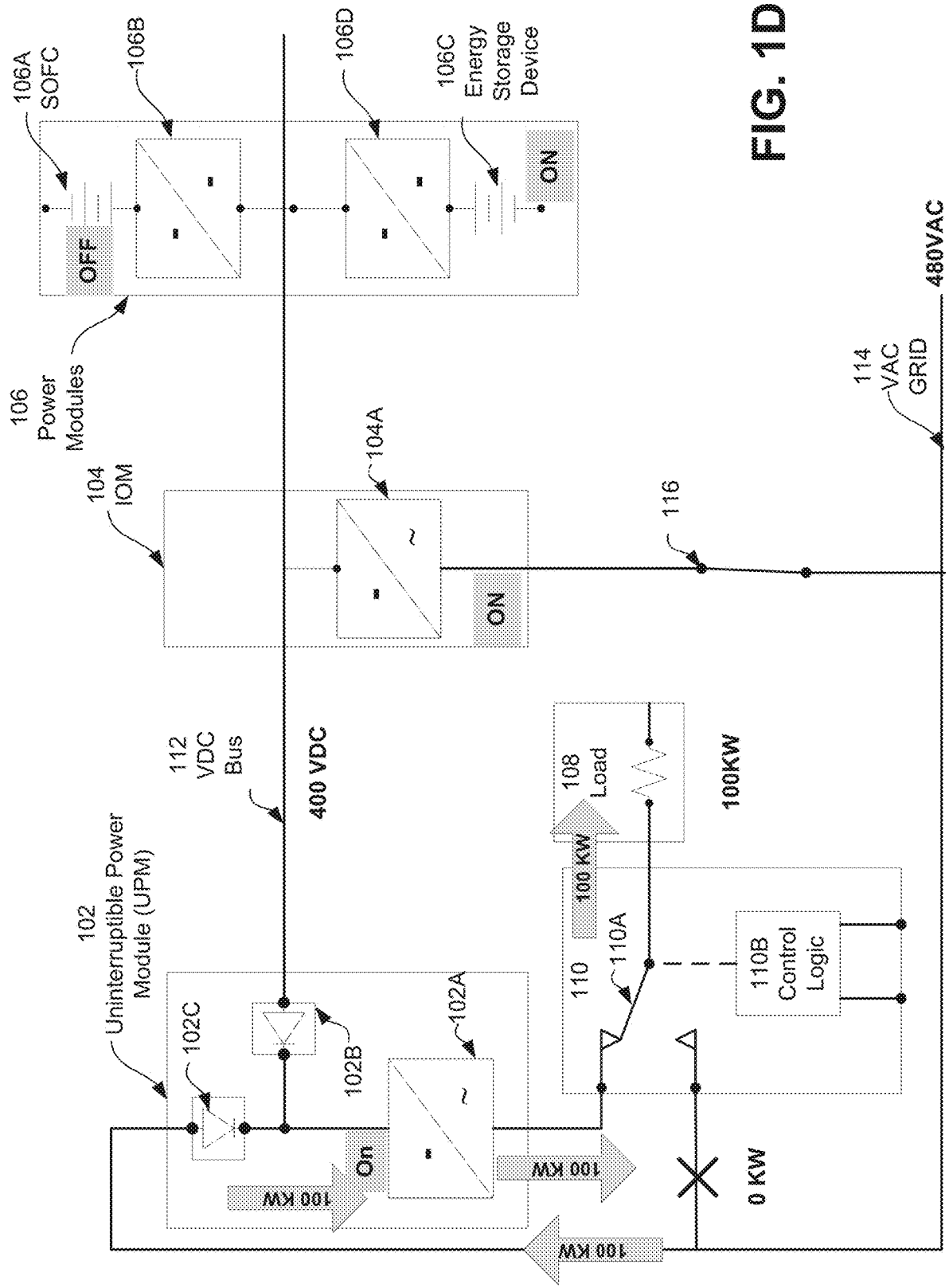

FIG. 1D illustrates the system operation during UPM start-up following TOM start-up. UPM functions by receiving power from the energy storage device 106C. UPM provides the power from the energy storage device 106C to the load 108. As shown in this figure, the fuel cell segment(s) 106A are in the OFF state and the energy storage device 106C is in the ON state. The IOM 104 bi-directional inverter 104A is in the ON state and the UPM inverter 102A is in the ON state. The second switch 116 is closed such that there is electrical communication between the TOM and the grid. The control logic switch 110A is in the second position to provide power from the UPM 102 to the load 108 through the control logic module 110. As shown in the figure, 100 kW of power is provided from the grid 114 to the load 108 through the rectifier 102C and inverter 102A of the UPM 102 and then through the control logic module. Some power may also be provided to the load 108 from the energy storage device 106C via the DC bus 112, UPM 102 and control logic module.

Figure 1E:
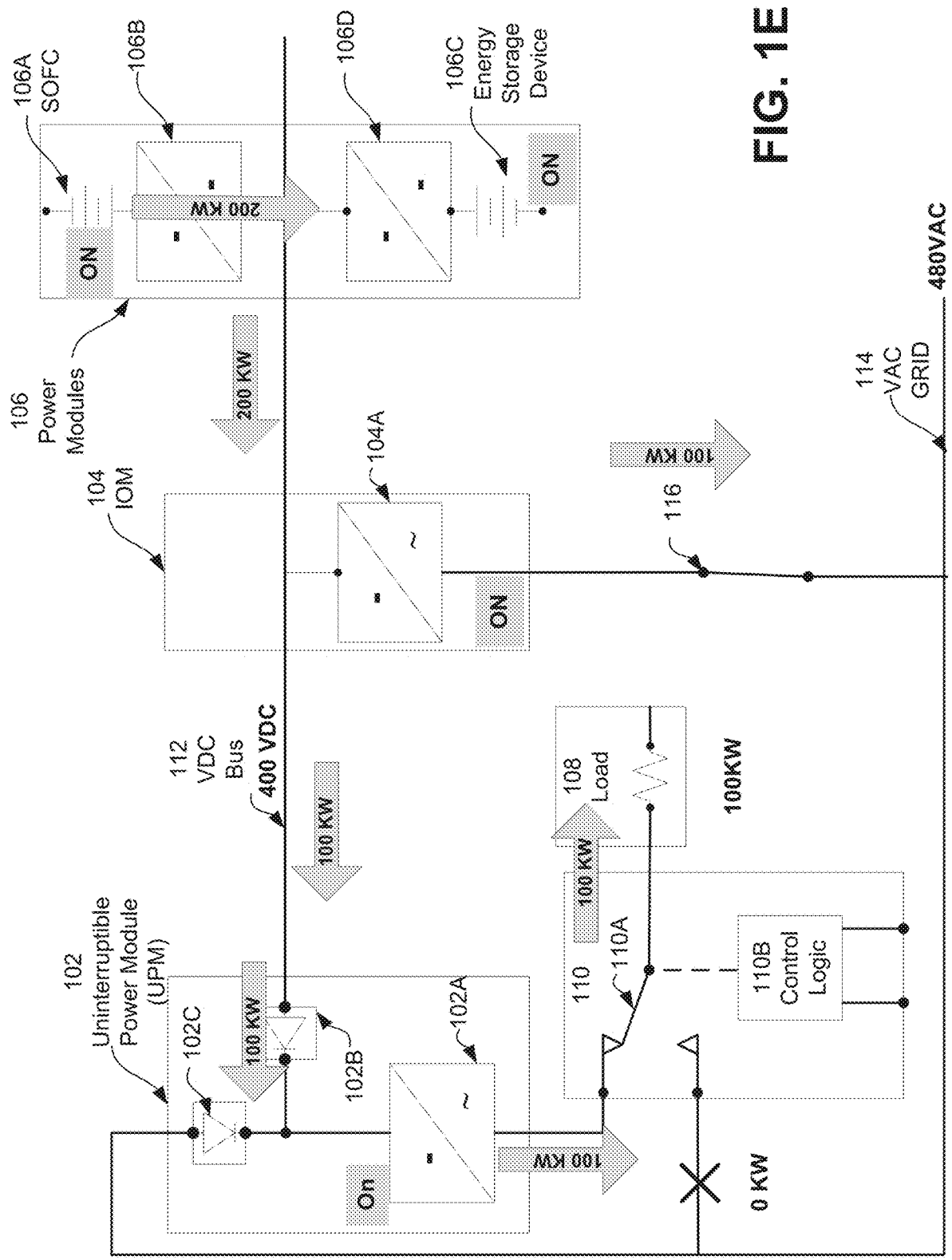

FIG. 1E illustrates the steady state operation of the system. In this mode the fuel cell segment(s) 106A is in the ON state to power the load 108. The segment(s) 106A may provide 200 kW of power in a steady state mode (this may be the designed power output or a maximum power output). As shown in this figure, the energy storage device 106C is in the ON state to act as an emergency backup power source. The IOM 104 bi-directional inverter 104A is in the ON state and the UPM inverter 102A is in the ON state. The 200 kW power output is split between the grid 114 and the load 108. The second switch 116 is closed such that there is electrical communication between the IOM and the grid to provide 100 kW of power from the fuel cell segment(s) 106A to the grid. The control logic switch 110A is in the second position to provide the other 100 kW of power from the fuel cell segment(s) 106A in the power module 106 through the DC bus passing through IOM 104 and through the inverter 102A of the UPM 102 and then through the control logic module 110 to the load 108. Preferably, this 100 kW of power does not pass through the IOM inverter 104A and/or the grid 114 to reach the load 108. While a 200 kW power output split 50/50 between the grid and the load is described above, different power outputs may be used as needed, such as 25 kW to 1000 kW, which may be split 10/90 to 90/10 between the grid and the load.

Figure 1F:
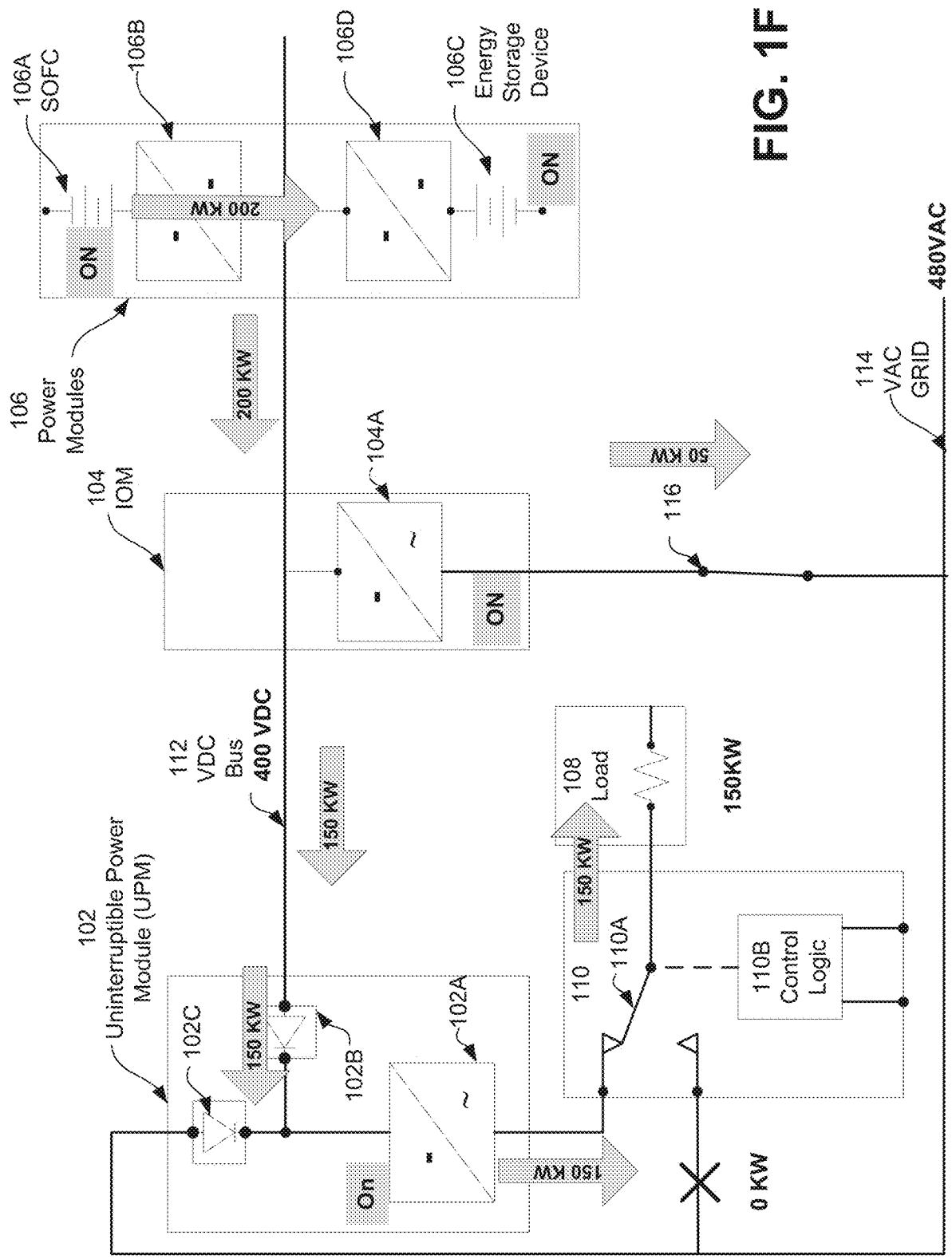

FIG. 1F illustrates operation of the system during a relatively steady load 108 increase from 100 kW to 150 kW (i.e., when the load requires more power than prior steady state operation). In this mode, more of the power output of the fuel cell segment(s) is provided to the load and less of this power output is provided to the grid than in the stead state mode described above. If desired, 100% of the power output may be provided to the load and 0% to the grid. The fuel cell segment(s) 106A is in the ON state to power the load 108. As shown in this figure, the energy storage device 106C is in the ON state to act as an emergency backup power source. The TOM 104 bi-directional inverter 104A is in the ON state and the UPM inverter 102A is in the ON state. The second switch 116 is closed such that there is electrical communication between the TOM and the grid to provide 50 kW of power from the fuel cell segment(s) 106A through the IOM inverter 104A to the grid 114. The control logic switch 110A is in the second position to provide 150 kW of power from the fuel cell segment(s) 106A in the power module 106 through the DC bus passing through TOM 104 and through the inverter 102A of the UPM 102 and then through the control logic module 110 to the load 108. Thus, the power output of the fuel cell segment(s) 106A is preferably split between the grid and the load in this mode. Preferably, the power does not pass through the TOM inverter 104A and/or the grid 114 to reach the load 108.

Figure 1G:
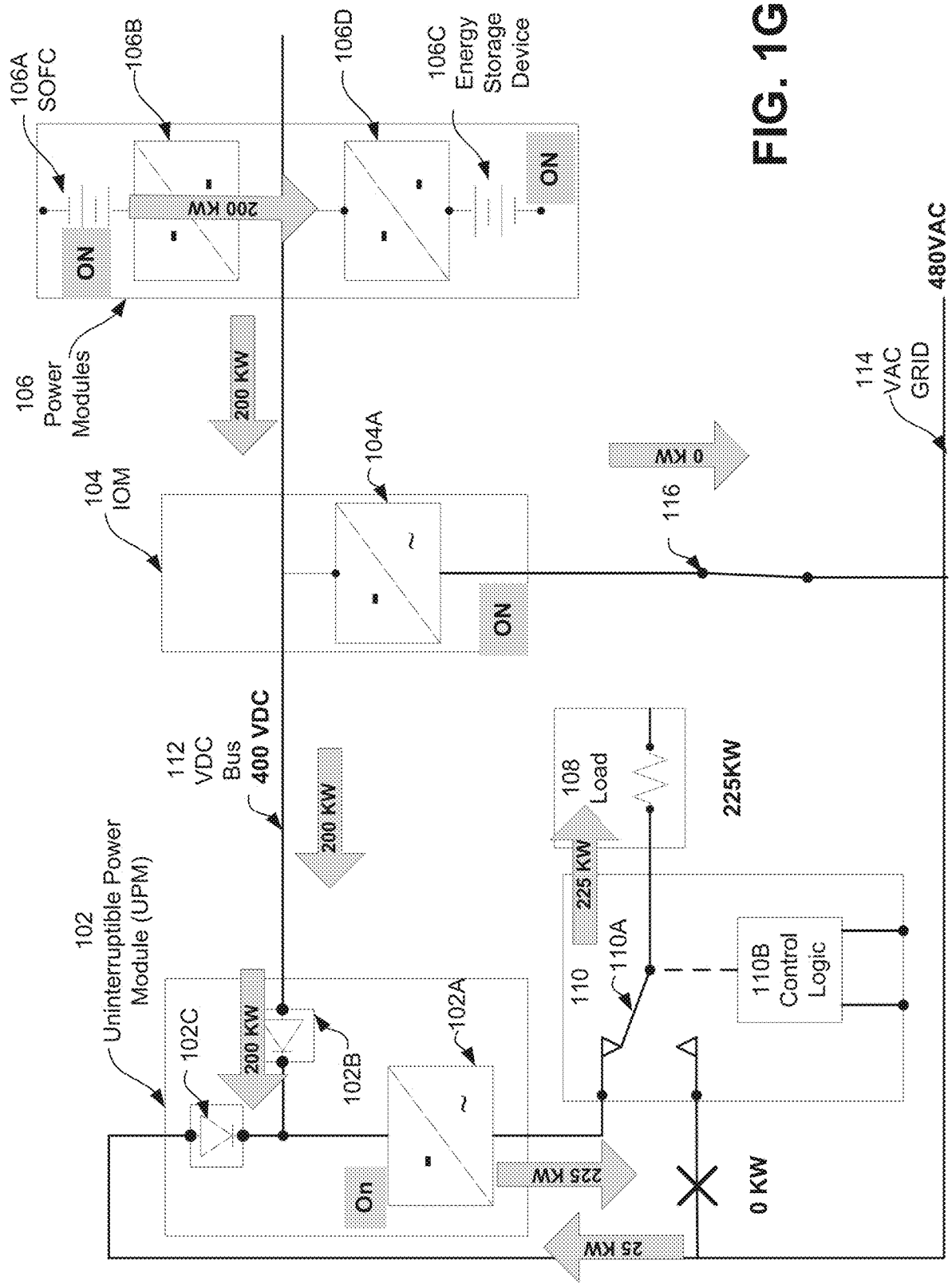

FIG. 1G illustrates operation of the system during a sudden load 108 spike which requires more power than the fuel cell segment(s) 106A can generate at that time. For example, the load spike is from 100 kW to 225 kW while the segment(s) 106A can only generate 200 kW of power in steady state or in maximum power mode. The fuel cell segment(s) 106A is in the ON state to power the load 108. As shown in this figure, the energy storage device 106C is in the ON state to act as an emergency backup power source. The TOM 104 bi-directional inverter 104A is in the ON state and the UPM inverter 102A is in the ON state. The second switch 116 is closed such that there is electrical communication between the IOM and the grid. However, no power is provided from fuel cell segment(s) 106A through the TOM inverter 104A to the grid 114 due to the load spike. The control logic switch 110A is in the second position to provide power from the fuel cell segment(s) 106A in the power module 106 and from the grid 114 through the DC bus passing through IOM 104 and through the inverter 102A of the UPM 102 and then through the control logic module 110 to the load 108. In this mode, the power to the load is provided from both the fuel cell segment(s) and the grid. As shown, 200 kW from the segment(s) 106A is provided through the DC bus 112, diode 102B, inverter 102A and switch 110A to the load 108, while 25 kW is provided from the grid 114 through the rectifier 102B, inverter 102A and switch 110A to the load 108 to achieve a total 225 kW of power required by the load. Preferably, the power from the fuel cell segment(s) does not pass through the IOM inverter 104A and/or the grid 114 to reach the load 108.

Figure 1H:
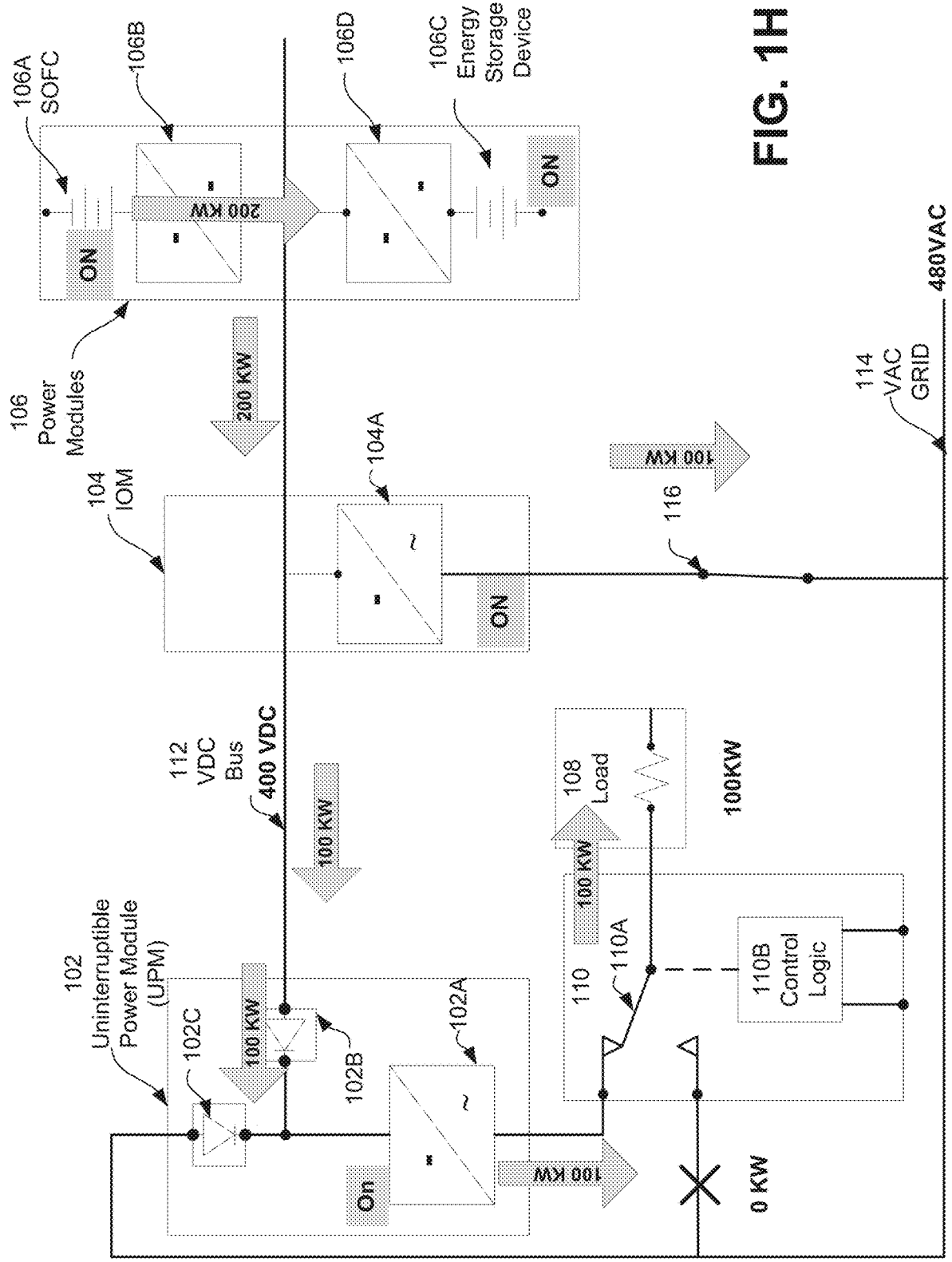

FIG. 1H illustrates operation of the system during a return to normal or steady state operation after the sudden load 108 spike. The fuel cell segment(s) 106A is in the ON state to power the load 108. As shown in this figure, the energy storage device 106C is in the ON state to act as an emergency backup power source. The TOM 104 bi-directional inverter 104A is in the ON state and the UPM inverter 102A is in the ON state. The second switch 116 is closed such that there is electrical communication between the IOM and the grid. The control logic switch 110A is in the second position to provide power from the fuel cell segment(s) 106A in the power module 106 through the DC bus passing through IOM 104 and through the inverter 102A of the UPM 102 and then through the control logic module 110 to the load 108. In this mode, the fuel cell segment(s) continue to output steady state or maximum power (e.g., 200 kW) which is split between the load and the grid. As shown, 200 kW from the segment(s) 106A is provided to the IOM 104. IOM 104 provides 100 kW of power from fuel cell segment(s) 106A through the IOM inverter 104A to the grid 114. The DC bus 112 provides the remaining 100 kW of power from IOM 104 through diode 102B, inverter 102A and switch 110A to the load 108. Preferably, the power does not pass through the IOM inverter 104A and/or the grid 114 to reach the load 108.

Figure 1I:
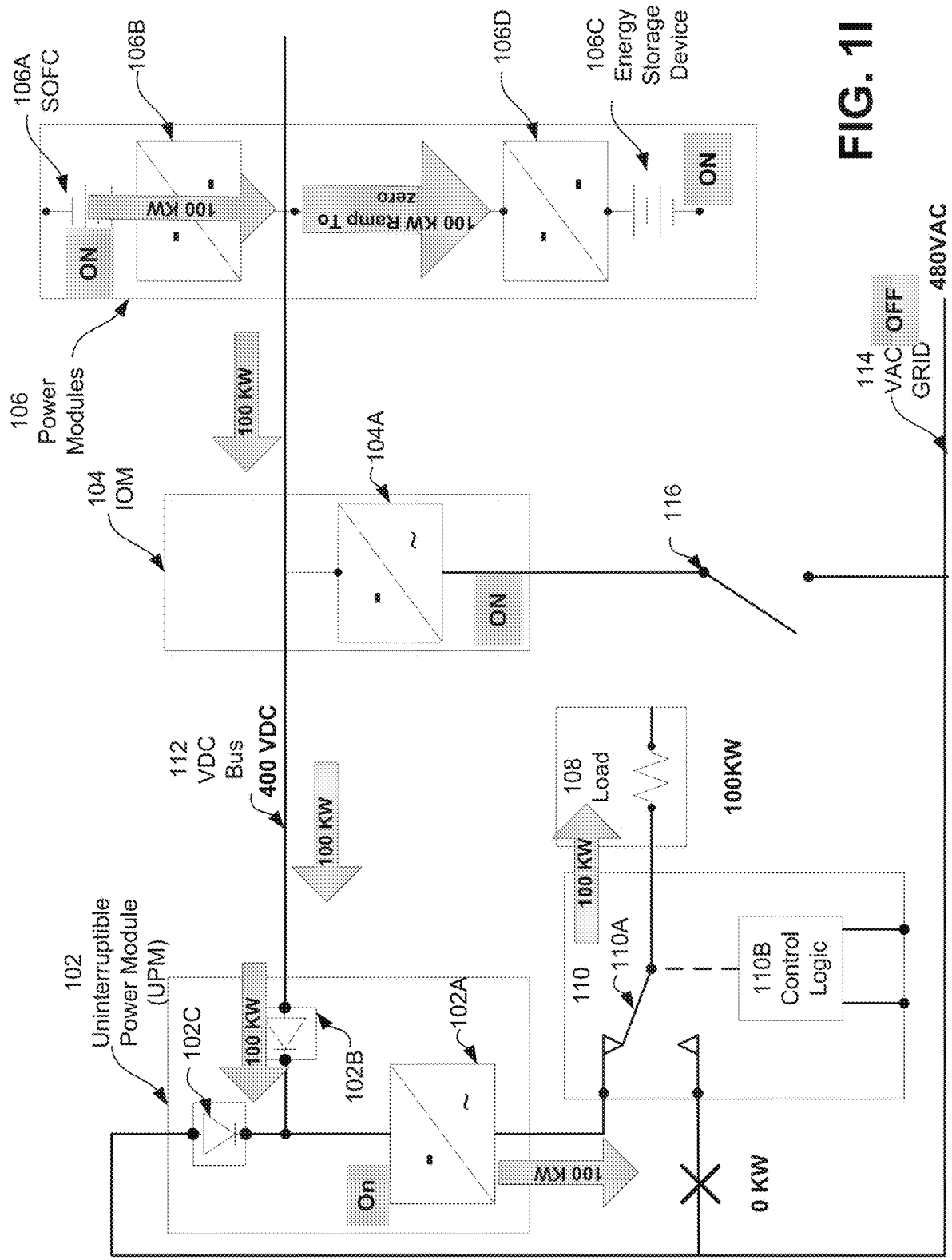

FIG. 1I illustrates operation of the system during loss of power from the grid 114 (e.g., during a black out). The fuel cell segment(s) 106A is in the ON state to power the load 108. As shown in this figure, the energy storage device 106C is in the ON state to absorb power from the fuel cell segment(s) 106A and to the soften the "step" that occurs during the loss of the grid power. The IOM 104 bi-directional inverter 104A is in the ON state and the UPM inverter 102A is in the ON state. The second switch 116 is opened such that there is no electrical communication between the TOM and the grid. A sensor can sense the loss of grid power and a controller can open the switch 116 in response to the sensed grid outage. The control logic switch 110A is in the second position to provide power from the fuel cell segment(s) 106A in the power module 106 through the DC bus passing through IOM 104 and through the inverter 102A of the UPM 102 and then through the control logic module 110 to the load 108. In this mode, out of the 200 kW total power output from the segment(s) 106A, 100 kW is provided to the DC bus 112 and 100 kW is provided to the energy storage device 106C to soften the step. The DC bus 112 provides the 100 kW of power from IOM 104 through diode 102B, inverter 102A and switch 110A to the load 108. The power output of the segment(s) 106A is then gradually reduced to 100 kW to meet the requirements of the load 108.

FIG. 1J illustrates operation of the system during loss of power from the grid 114 (e.g., during a black out) and in case of a load transient (e.g., increased demand for power from load 108) while the fuel cell segment(s) output a reduced amount of power (e.g., 100 kW) which meets the steady state requirements of the load. The fuel cell segment(s) 106A is in the ON state to power the load 108. As shown in this figure, the energy storage device 106C is in the ON state to provide additional power to the load 108. The IOM 104 bi-directional inverter 104A is in the ON state and the UPM inverter 102A is in the ON state. The second switch 116 is opened such that there is no electrical communication between the IOM and the grid. The control logic switch 110A is in the second position to provide power from the fuel cell segment(s) 106A and the energy storage device 106C in the power module 106 through the DC bus passing through TOM 104 and through the inverter 102A of the UPM 102 and then through the control logic module 110 to the load 108. In this mode, 100 kW from the segment(s) 106A and 50 kW from the energy storage device is provided to the DC bus 112. Thus, the DC bus 112 provides the 150 kW of power from IOM 104 through diode 102B, inverter 102A and switch 110A to the load 108. Preferably, the power does not pass through the IOM inverter 104A and/or the grid 114 to reach the load 108.

FIG. 1K illustrates operation of the system during loss of power from the grid 114 (e.g., during a black out) and in case of a continuing load transient (e.g., continued increased demand for power from load 108). The operation is the same as that shown in FIG. 1J, except that the power output of the energy storage device 106C is ramped down to zero over time and the power output of the fuel cell segment(s) is ramped up to the power needed by the load (e.g., 150 kW) over the same time. Thus, over time, the load receives more and more power from the fuel cell segments) 106A and less and less power from the energy storage device 106C until all of the required power is supplied to the load 108 by the fuel cell segment(s). Thus, the energy storage device acts as a bridging power source during the initial load transient and is then phased out during the continuing load transient.

Figure 3:
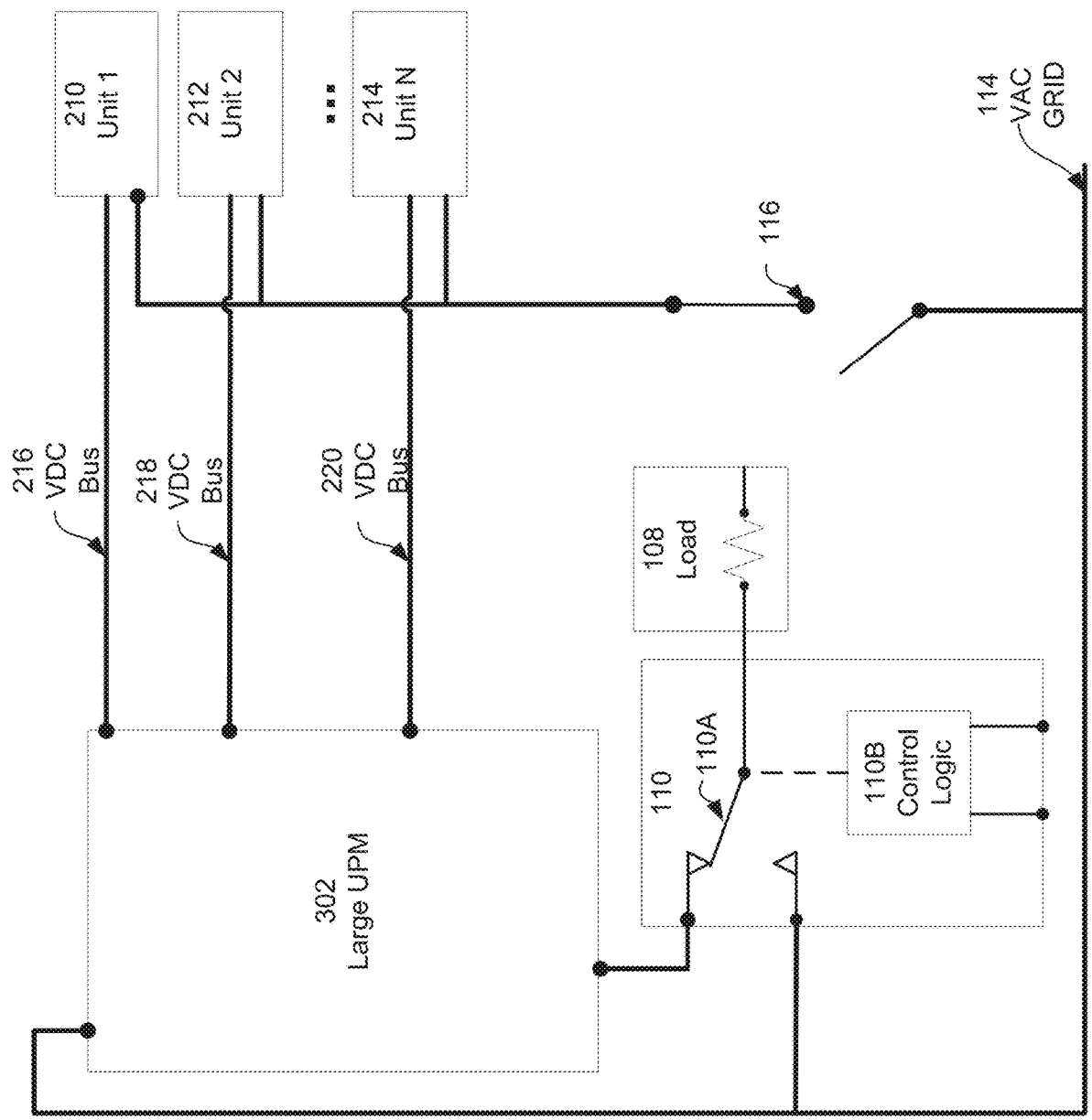

Referring to FIGS. 2 and 3, the output of the DC sources 1 to N (210, 212 and 214) are paralleled at the DC-output point to one or more respective DC buses 216, 218, 220. Each DC source 1 to N may comprise one or more power module(s) 106 and an associated TOM 104. The 1 to N sources feed the customer load via a single UPM 202 assembly. Thus, the plurality of power module/TOM pairs share a common UPM. For example, the DC bus may form a DC micro grid connecting any number of DC sources (e.g., SOFC and power conditioning systems) together at one UPM 202. The UPM 202 may be a large assembly of individual UPM's 102 shown in FIG. 1A capable of output of many multiples of the output of the SOFC systems themselves. As illustrated, in FIG. 2, the UPM 202 assembly comprises "N" UPMs 102 (i.e., one UPM for each DC source), with a separate DC bus (216, 218 and 220) connecting each DC power source 210, 212 and 214 to a dedicated UPM 102. The N UPM's 102 may be arranged in close proximity (e.g., side by side) in one housing or in separate housings to form the UPM assembly 202.

In an alternative embodiment shown in FIG. 3, the assembly 202 of smaller dedicated UPM's 102 may be replaced by one large UPM 302. In this embodiment, the UPM 302 may include an electrical storage device (e.g., bank of batteries or supercapacitors) and/or a synchronous motor (not illustrated in FIG. 3). In general, UPM inverters may include rotating machinery (e.g., a motor, flywheel, etc.) to enhance stored energy content and/or increase reliability and inertia of output.

In summary, the DC sources may comprise fuel cell power modules and an IOM. The inverter within each UPM may be a modular assembly of smaller inverters controlled as one large inverter acting with inputs and/or outputs in parallel. An inverter within the main IOM may be a modular assembly of smaller inverters which are controlled as one large inverter acting with inputs and/or outputs in parallel.

In an embodiment, rectification is provided in the UPM to allow feed from the grid when the stacks are off-line, thus providing the load a protected bus. A boost converter may be used to maintain a good power factor to the grid.

In another embodiment, power from stored energy within an SOFC system or the UPM is used to create a "UPS" unit which has three energy inputs: grid energy; SOFC segment energy; and stored energy (e.g., ultracapacitors or batteries).

In yet another embodiment, a DC micro-grid is connected to other distributed generators such as solar power hardware or wind power hardware.

In an embodiment, the DC micro-grid is connected to DC loads such as the loads of DC data centers or DC vehicle chargers.

In yet another embodiment, when an TOM and UPM are composed of a cluster of inverters acting in parallel, some or all these inverters may be de-energized depending upon customer load conditions. For example, in a 200 kW generation capacity scenario where the customer load is 150 kW, the IOM inverters may be de-energized such that they only support 50 kW instead of a full 200 kW of grid-tied output. Further, in this scenario, it may be that only a portion of the possible inverters in the TOM assembly may be installed into the IOM, thus providing cost savings in terms of equipment required to support the specific customer load scenario.

Figure 4:
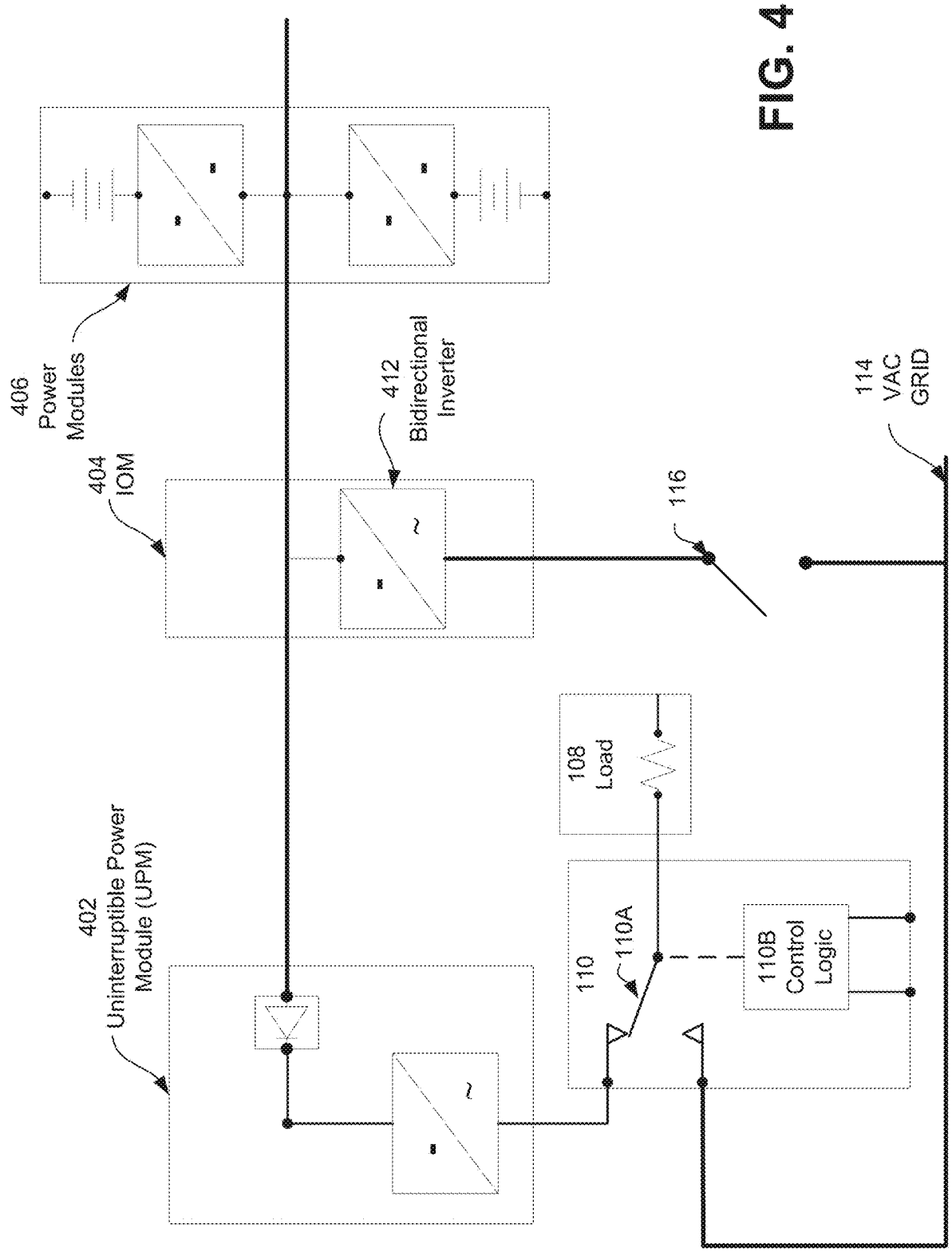
FIG. 4 is a block diagram illustrating an IOM comprising an inverter that is configured for "bi-directional" operation according to an embodiment.

Referring to FIG. 4, in an embodiment, an IOM 404 comprises inverters 412 that are configured for "bi-directional" operation. Such an inverter may have four-quadrant operation. If the grid-tied inverter has "bi-directional" operation, then the rectified feed does not need to be supplied to the UPM 402. Grid power during start-up may come through the grid tied inverter 412 instead of via a rectified input to the UPM 402. This embodiment also provides power from power module(s) 406 for protection of the customer load.

Figure 5:
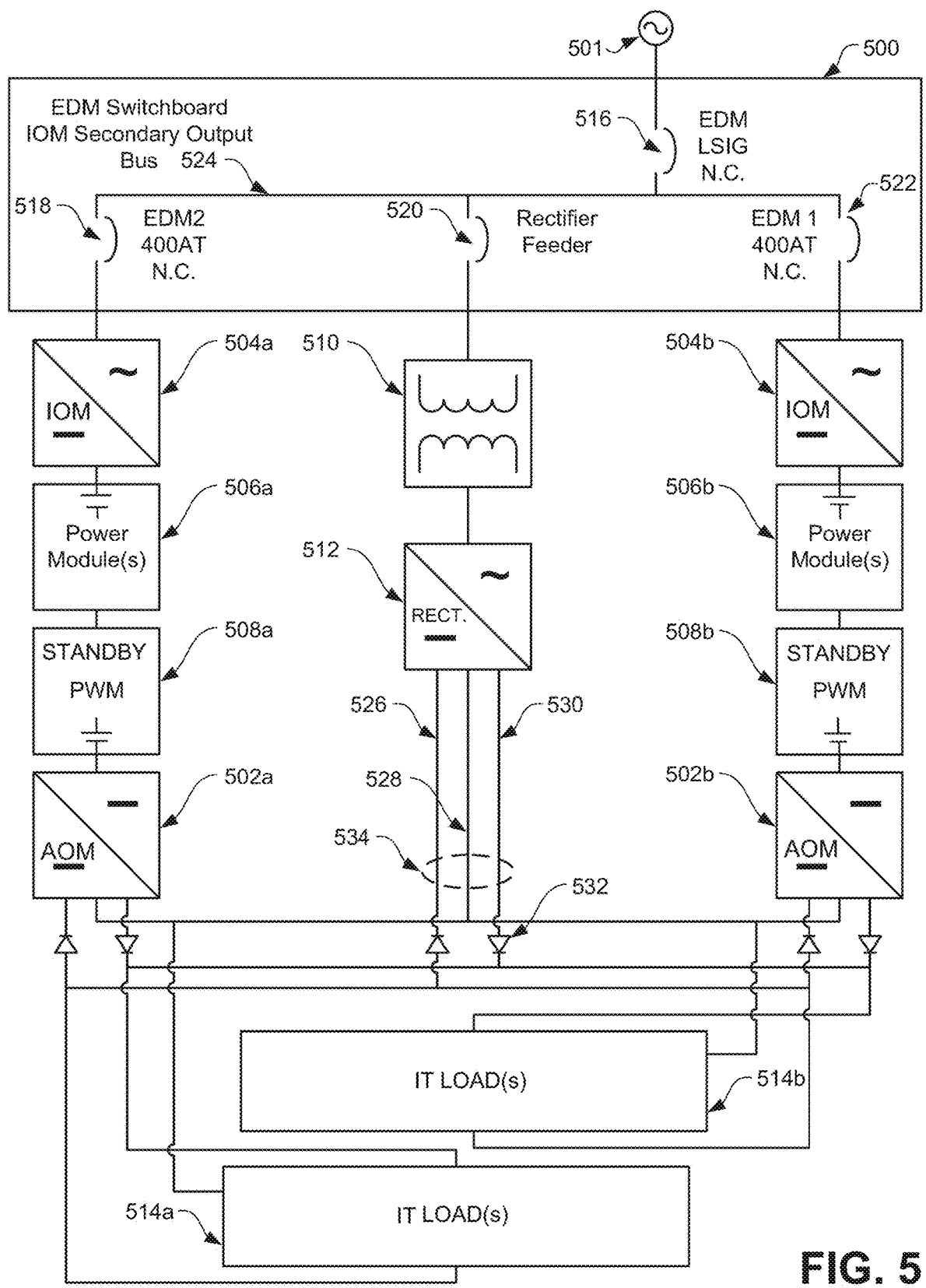
FIG. 5 is a block diagram illustrating embodiment systems for powering a single corded information technology load.

FIG. 5 illustrates embodiment systems for powering a single corded information technology load. In various embodiments the system may include an electrical distribution module 500 electrically connected to at least one TOM 504a, 504b, at least one power module 506a, 506b (or group of power modules), at least one service power module (PWM) bay 508a, 508b, at least one A-side output module (AOM) 502a, 502b having a DC/DC converter, and at least one information technology (IT) device 514a, 514b (or group of IT devices). Each of the power modules 506a, 506b, may include a group of power modules connected to at least one other power module of the group of power modules, and may be connected in series. The electrical distribution module 500 may also be electrically connected to a transformer 510 and a rectifier 512, such as an AC/DC converter, which may also be connected to the AOM 502a, 502b, and the IT device 514a, 514b via an electrical bus 534. In various embodiments, the transformer 510 may be optional, and the electrical distribution module 500 may be directly connected to the rectifier 512. The electrical bus 534 may be a split bus having at least one positive current electrical conduit 530, at least one negative current electrical conduit 526, and at least one neutral (or ground) electrical conduit 528. The AOM 502a, 502b, may be connected to the IT device 514a, 514b, using the positive current electrical conduit 530 and the negative current electrical conduit 526. In various embodiments, having groups of IT devices 514a, 514b, such as multiple work stations or racked servers, the individual IT devices may be individually connected to the positive current electrical conduit 530 and the negative current electrical conduit 526 by separate leads of the positive current electrical conduit 530 and the negative current electrical conduit 526. In various embodiments, the individual IT devices of the groups of IT devices 514a, 514b, may be individually connected to separate positive current electrical conduits 530 and separate negative current electrical conduits 526. In various embodiments, pairs or groups of IT devices 514a, 514b may be electrically connected so that at least one of the IT devices 514a, 514b may be connected to a positive current electrical conduit 530 and another of the IT devices 514a, 514b may be connected to a negative current electrical conduit 526. In various embodiments, the TOM 504a, 504b, the power module 506a, 506b, and the AOM 502a, 502b, may include structural components and functions as described herein with reference to the IOMs 104, 404, and power modules 106, 406, described herein relating to FIGS. 1-4.

In various embodiments, current flow control devices 532, such as diodes, may be electrically connected along the positive current electrical conduit 530 and the negative current electrical conduit 526, between the rectifier 512 and the AOM 502a, 502b, in various configurations. The current flow control devices 532 may be configured to prevent opposite polarity current flow to the rectifier 512 and the AOM 502a, 502b, on the positive current electrical conduit 530 and the negative current electrical conduit 526. In various embodiments, the AOM 502a, 502b, and more specifically the DC/DC converter of the AOM 502a, 502b, and the rectifier 512 may be configured to prevent opposite polarity current flow to the components electrically connected between the AOM 502a, 502b, or the rectifier 512 and the electrical distribution module 500, by lowering the rectified voltage.

The electrical distribution module 500 may distribute AC current from an AC current source 501, such as an electric utility source, for example, an electrical grid, to the IOM 504a, 504b, and distribute AC current from the IOM 504a, 504b, to the AC current source 501. The electrical distribution module 500 may electrically connect the AC current source 501 and the IOM 504a, 504b via an output bus 524. Electrical connectors, such as breakers, switches, and fuses, may be electrically connected along the output bus 524 in various configurations to prevent current flow between the AC current source 501 and various components of the system. An electrical connector 516 may be configured to electrically connect and electrically isolate all of the system components electrically connected to the distribution module 500 from the AC current source 501. In various embodiments the electrical connector 516 may include a long time, short time, instantaneous, and ground fault (LSIG) breaker, which may be configured to be normally closed. An electrical connector 518 may be configured to electrically connect and electrically isolate the TOM 504a, the power module 506a, the service PWM bay 508a, and the AOM 502a, from the AC current source 501. An electrical connector 522 may be configured to electrically connect and electrically isolate the TOM 504b, the power module 506b, the service PWM bay 508b, and the AOM 502b, from the AC current source 501. In various embodiments, the electrical connector 518 and the electrical connector 522 may include the same or different structure and/or function. For example, the electrical connectors 518 and 522 may each include a breaker having a 400 A trip threshold and may be configured to be normally closed. An electrical connector 520 may be configured to electrically connect and electrically isolate the transformer 510 and the rectifier 512 from the AC current source 501.

The various embodiments of the system include a singled corded power supply to each of the IT devices 514a, 514b, having at least two potential current sources, the power module 506a, 506b, and the AC current source 501. As shown in FIG. 5, each IT device 514a, 514b, may be electrically connected to at least one of the power modules 506a, 506b, via the AOMs 502a, 502b, and the service PWM 508a, 508b, and to the AC current source 501 via the rectifier 512 and the transformer 510. Thereby, each IT device 514a, 514b, may receive power via a single electrical connection from one or more current sources, including DC current from one or more of the power modules 506a, 506b, and AC current from the AC current source 501, connected to the IT device 514a, 514b, in parallel, i.e., a single redundant DC current feed. Thereby, redundant DC current is provided to each IT device 514a, 514b in case a current source fails. In various embodiments, the electrical distribution module 500 may be configured to control the electrical connectors 518, 520, and 522, to control the flow of AC current to the various components electrically connected to the electrical distribution module 500, and to control the amount of current provided to the IT device 514a, 514b, from the power module 506a, 506b, and the AC current source 501.

Under normal operation, one or more of the power modules 506a, 506b, may be configured to provide all the necessary current to power the IT device 514a, 514b. In various embodiments, the AC current source 501 may provide insufficient current to power any number of the IT devices 514a, 514b, and may be used only to supplement the current provided by the power modules 506a, 506b. For example, the AC current source 501 may provide insufficient current to power a single IT device 514a, 514b or multiple of a group of IT devices 514a, 514b. As such, the electrical distribution module 500 may be configured to provide current from the AC current source 501 to the transformer 510 to supplement current from the power module 506a, 506b. Thus, the system may use the AC current source 501 as a ready standby source, for example, a hot standby, of electrical power. The power module 506a, 506b, may be configured to generate and provide sufficient current to power at least one and as many as all or more of the IT devices 514a, 514b. In various embodiments, the electrical distribution module 500 may be configured to normally keep the electrical connector 520 open, isolating the transformer 510 and the rectifier 512 from the AC current source 501. Keeping the electrical connector 520 open may result from sensing or receiving a signal, for example, from the IT device 514a, 514b, or the power module 506a, 506b, that sufficient current is being provided by the power module 506a, 506b, to power the IT device 514a, 514b. Keeping the electrical connector 520 open may alternatively result from a lack of signal indicating insufficient power or a fault condition. In various embodiments, the electrical distribution module 500 may be configured to provide current from the AC current source 501 in response to sensing or being signaled, for example, by the IT device 514a, 514b, or the power module 506a, 506b, that insufficient current is being provided by the power module 506a, 506b, to power the IT device 514a, 514b, or that a fault condition exists. To provide the current from the AC current source 501, the electrical distribution module 500 may close the electrical connector 520. In various embodiments, the electrical distribution module 500 may be configured to control the electrical connector 520 for providing supplemental power based on sensor readings or signals relating to one or more of the IT devices 514a, 514b or power modules 506a, 506b, individually or as a group. In various examples, the electrical connector 520 may be closed to provide supplemental power in response to one or more power modules 506a, 506b, being offline or in a reduced output state, either for maintenance or due to a fault condition. In various examples, the AC current source 501 capacity may be adjusted to a variable ratio of the critical load of the IT devices 514a, 514b, individually or as a group, from 20% to 100%. In various embodiments in which the AC current source 501 is insufficient to cure the power deficit for powering the IT devices 514a, 514b, or instead of using the AC current source 501, standby power modules of the service PWM bay 508 may be activated to provide supplemental DC current.

As noted herein, the IOM 504a, 504b, the power module 506a, 506b, and the AOM 502a, 502b, may include structural components and functions as described herein with reference to the IOMs 104, 404, and power modules 106, 406, described herein relating to FIGS. 1-4. Therefore, it is recognized that the TOM 504a, 504b, may be configured to receive AC current from the AC current source 501, via the electrical distribution module 500, and convert the AC current to DC current. The IOM 504a, 504b, may provide the DC current to the power modules 506a, 506b, which may store the DC current in an energy storage device (not shown). The IOM 504a, 504b, may also convert DC current provided by the power modules 506a, 506b, to AC current, and provide the AC current to the AC current source 501. The power modules 506a, 506b, may provide the stored DC current and/or generated DC current to the AOM 502a, 502b, which are configured to control the amount of DC current provided to the IT device 514a, 514b, via the DC/DC converter therein.

In various embodiments, AC current provided may be provided to the transformer 510 via the electrical distribution module 500. The transformer 510 may be configured to control the voltage of the incoming AC current provided to the rectifier 512, via various known means. Similar to some functions of the IOM 504a, 504b, the rectifier 512 may be configured to convert the AC current to DC current, and may be further configured to provide the DC current to the IT device 514a, 514b. The rectifier 512 may also be configured to control the amount of DC current output to the IT device 514a, 514b.

It is conceived that the system may include more or fewer electrical connectors 518, 522, IOMs 504a, 504b, power modules 506a, 506b, service PWM bays 508a, 508b, AOMs 502a, 502b, and IT devices 514a, 514b, than the embodiments illustrated in FIG. 5 and described herein. For example, the system may include at least one of each of the electrical connectors 518, 522, IOMs 504a, 504b, power modules 506a, 506b, service PWM bays 508a, 508b, and AOMs 502a, 502b, for each IT device 514a, 514b.

In an non-limiting example, the IT devices 514a, 514b, may each include multiple racked servers requiring 20 kW of DC current per rack. The power modules 506a, 506b, may each be able to generate power such that the output of the AOMs 502a, 502b, is 380V DC. In such an example, each power module of the groups of power modules 506a, 506b, may be configured to output 40 kW or 50 kW of DC current, or each group of power modules 506a, 506b, may be configured to output 200 kW of DC current. The power output by the AOMs 502a, 502b may be insufficient to meet the power requirements of the IT devices 514a, 514b. To supplement the power needed to meet the power requirements of the IT devices 514a, 514b, the standby power modules of the service PWM bay 508 may be activated to provide 50 kW of DC current, and/or the electrical connector 520 may be closed to receive current from the AC current source 501. The transformer 510 receiving the AC current may be a three phase transformer rated at 500 kVA and for 480V primary and 480/277V secondary. The output of the transformer 510 may be regulated by the rectifier 512 such that it outputs up to 375V to supplement the energy provided by the power modules 506a, 506b.

In various embodiments, the power modules 506a, 506b, may be electrically connected to the IT devices 514a, 514b, via the AOMs 502a, 502b. In various embodiments, individual ones or groups of the power modules 506a, 506b, may be directly electrically connected to individual ones or groups of the IT devices 514a, 514b. In the direct connection configuration, the power modules 506a, 506b, may be configured to output current levels sufficient to power the directly connected IT devices 514a, 514b.

In various embodiments, the power modules 506a, 506b, may include an additional alternative energy generator, including combustion, photovoltaic, mechanical, and chemical generators, and/or energy storage devices. These additional energy sources may supplement the power of the power modules 506a, 506b, as needed during a service event, for redundancy reasons, during concurrent maintenance, and for overload capacity. Each additional energy source may be incorporated into a single enclosure with one or more of the power modules 506a, 506b. For example, the additional energy source may be enclosed in, mounted to, or extended through the enclosure.

In various embodiments, the power modules 506a, 506b, may be in close proximity to the IT devices 514a, 514b. Separate enclosures of the power modules 506a, 506b, and the IT devices 514a, 514b, may be located within the same room, building, and work or living site. In various embodiments, the power modules 506a, 506b, and the IT devices 514a, 514b, may be electrically and/or mechanically integrated within a single enclosure.

Figure 6:
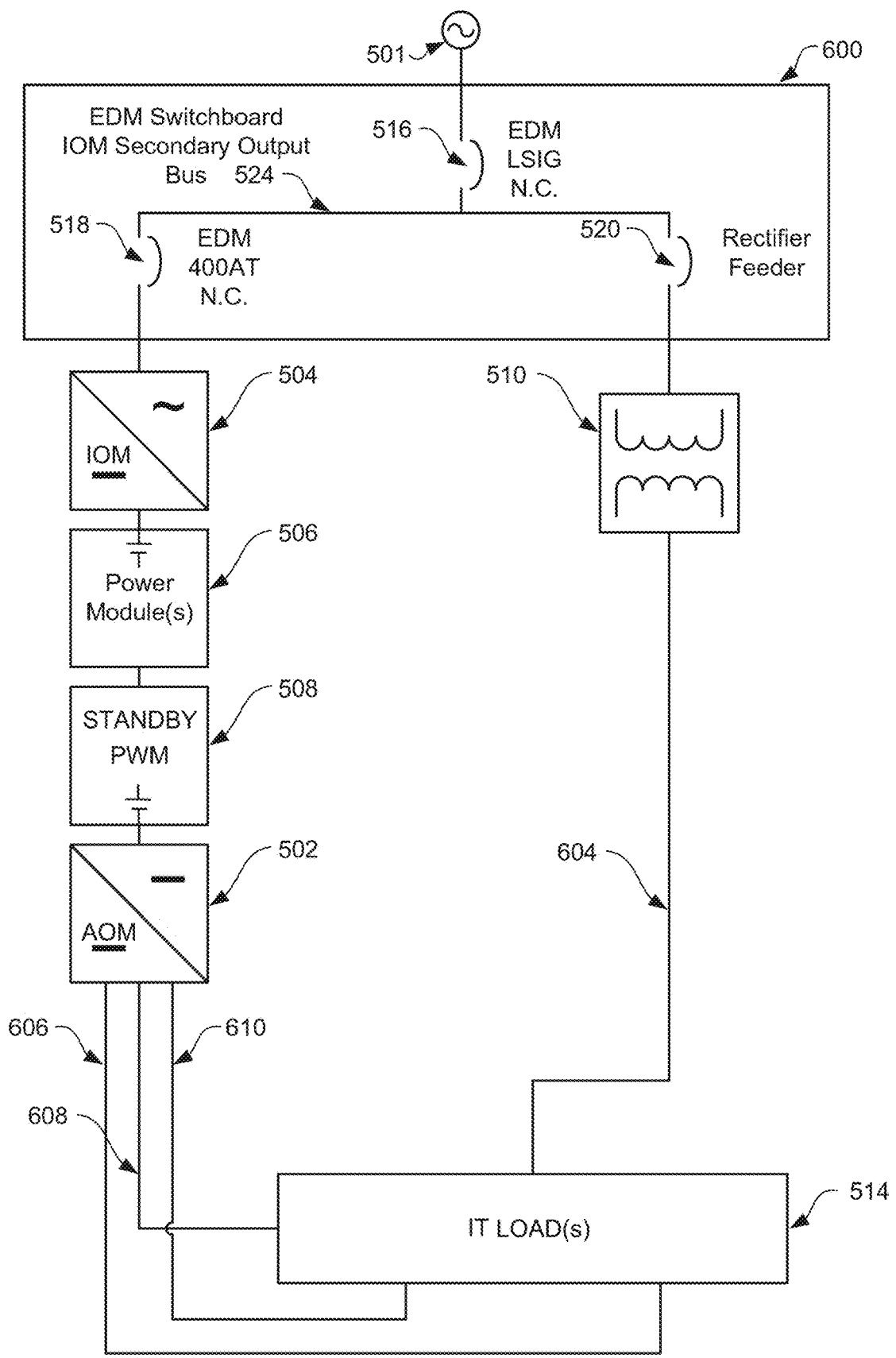
FIG. 6 is a block diagram illustrating embodiment systems for powering a dual corded information technology load.

FIG. 6 illustrates embodiment systems for powering a dual corded information technology load. Like components sharing the same reference numerals with FIG. 5 may be similarly configured and have similar functions for the embodiments described herein relating to FIG. 6. In various embodiments the system may include an electrical distribution module 600 electrically connected to an IOM 504, at least one power module 506 (or group of power modules), a service power module (PWM) bay 508, an AOM 502 having a DC/DC converter, and at least one information technology (IT) device 514 (or group of IT devices). Each of the power modules 506 may include a group of power modules connected to at least one other power module of the group of power modules, and may be connected in series. The electrical distribution module 600 may also be electrically connected to a transformer 510, which may also be connected to the IT device 514 via an electrical bus 604. In various embodiments, the transformer 510 may be optional, and the electrical distribution module 600 may be directly connected to the IT device 514. The AOM 502 may be connected to the IT device 514 using a positive current electrical conduit 610, a negative current electrical conduit 606, and a neutral/ground electrical conduit 608. In various embodiments having groups of IT devices 514, such as multiple work stations or racked servers, the individual IT devices may be individually connected to the positive current electrical conduit 610 and the negative current electrical conduit 606 by separate leads of the positive current electrical conduit 610 and the negative current electrical conduit 606. In various embodiments the individual IT devices of the groups of IT devices 514 may be individually connected to separate positive current electrical conduits 610 and separate negative current electrical conduits 606. In various embodiments, pairs or groups of IT devices 514 may be electrically connected so that at least one of the IT devices 514 may be connected to a positive current electrical conduit 610 and another of the IT devices 514 may be connected to a negative current electrical conduit 606. In various embodiments, the IOM 504, the power module 506, and the AOM 502, may include structural components and functions as described herein with reference to the IOMs 104, 404, 504a, 504b, power modules 106, 406, 506a, 506b, and AOMs 502a, 502b, described herein relating to FIGS. 1-5.

The electrical distribution module 600 may distribute AC current from an AC current source 501, such as an electric utility source, for example, an electrical grid, to the IOM 504, and distribute AC current from the IOM 504, to the AC current source 501. The electrical distribution module 600 may electrically connect the AC current source 501 and the TOM 504 via an output bus 524. Electrical connectors, such as breakers, switches, and fuses, may be electrically connected along the output bus 524 in various configurations to prevent current flow between the AC current source 501 and various components of the system. An electrical connector 516 may be configured to electrically connect and electrically isolate all of the system components electrically connected to the distribution module 500 from the AC current source 501. In various embodiments the electrical connector 516 may include a long time, short time, instantaneous, and ground fault (LSIG) breaker, which may be configured to be normally closed. An electrical connector 518 may be configured to electrically connect and electrically isolate the IOM 504, the power module 506, the service PWM bay 508, and the AOM 502, from the AC current source 501. In various embodiments, the electrical connector 518 may include a breaker having a 400 A trip threshold and may be configured to be normally closed. An electrical connector 520 may be configured to electrically connect and electrically isolate the transformer 510 from the AC current source 501.

The various embodiments of the system include a dual corded power supply to each of the IT devices 514, having two potential current sources, the power module 506 and the AC current source 501. As shown in FIG. 6, each IT device 514 may be electrically connected to the power module 506 via the AOM 502 and the service PWM 508, and to the AC current source 501 via the transformer 510. Thereby, each IT device 514 may receive power via multiple electrical connections from one or more current sources, including the power module 506 on the A-side input and the AC current source 501 on the B-side input, connected to the IT device 514 in parallel. However, unlike the embodiments described with reference to FIG. 5, the IT device 514 may only receive DC current from the power module 506 or AC current from the AC current source 501 at any time. In other words, the IT device 514 does not concurrently receive DC current from the power module 506 and AC current from the AC current source 501. In various embodiments, the electrical distribution module 600 may be configured to control the electrical connectors 518 and 520 to control the flow of AC current to the various components electrically connected to the electrical distribution module 600, and to control the amount of current provided to the IT device 514 from the power module 506 and the AC current source 501. As described herein the electrical distribution module 600 may be responsive to signals from the IT device 514, which may be a smart load configured to determine and control which current, AC or DC, it receives. The IT device 514 may include conversion components, such as inverters and/or converters, to convert the received AC or DC power to the appropriate current type for use by the IT device 514.

Under normal operation, one or more of the power modules 506 may be configured to provide all the necessary current to power the IT device 514. In various embodiments, the AC current source 501 may provide sufficient current to power any number of the IT devices 514. For example, the AC current source 501 may provide sufficient current to power a single IT device 514 or multiple of a group of IT devices 514. As such, the electrical distribution module 600 may be configured to provide current from the AC current source 501 to the transformer 510 to replace current from the power module 506. Thus, the system may use the AC current source 501 as a ready standby source, for example, a hot standby, of electrical power. The power module 506 may be configured to generate and provide sufficient current to power at least one and as many as all or more of the IT devices 514. In various embodiments, the electrical distribution module 600 may be configured to normally keep the electrical connector 520 open, isolating the transformer 510 from the AC current source 501. Keeping the electrical connector 520 open may result from sensing or receiving a signal, for example, from the IT device 514 or the power module 506, that sufficient current is being provided by the power module 506 to power the IT device 514. Keeping the electrical connector 520 open may alternatively result from a lack of signal indicating insufficient power or a fault condition. In various embodiments, the electrical distribution module 600 may be configured to provide current from the AC current source 501 in response to sensing or being signaled, for example, by the IT device 514 or the power module 506, that insufficient current is being provided by the power module 506 to power the IT device 514, or that a fault condition exists. The electrical distribution module 600 may close the electrical connector 520 to provide the current from the AC current source 501. In various embodiments, the electrical distribution module 600 may be configured to control the electrical connector 520 for providing replacement power based on sensor readings or signals relating to one or more of the IT devices 514 or the power modules 506, individually or as a group. In various examples, the electrical connector 520 may be closed to provide replacement power in response to one or more power modules 506 being offline or in a reduced output state, either for maintenance or due to a fault condition. In various embodiments, the IT devices 514 may be configured to individually or as a group selectively receive DC current from the power modules 506 on its A-side input or AC current from the AC current source 501 on its B-side input. In various embodiments, the power modules 506 may be configured to supplement the AC current of the AC current source 501 by providing DC current converted to AC current by the TOM 504 through the electrical connector 518 to the transformer 510 via the output bus 524 and the electrical connector 520. In various examples, the AC current source 501 capacity may be adjusted to a variable ratio of the critical load of the IT devices 514, individually or as a group, from 20% to 100%. In various embodiments in which the AC current source 501 is insufficient to cure the power deficit for powering the IT devices 514, or instead of using the AC current source 501, standby power modules of the service PWM bay 508 may be activated to provide supplemental DC current.

As noted herein, the IOM 504, the power module 506, and the AOM 502, may include structural components and functions as described herein with reference to the IOMs 104, 404, 504*a*, 504*b*, power modules 106, 406, 506*a*, 506*b*, and AOMs 502*a*, 502*b*, described herein relating to FIGS. 1-5. Therefore, it is recognized that the TOM 504 may be configured to receive AC current from the AC current source 501, via the electrical distribution module 600, and convert the AC current to DC current. The IOM 504 may provide the DC current to the power modules 506, which may store the DC current in an energy storage device (not shown). The IOM 504, may also convert DC current provided by the power modules 506, to AC current, and provide the AC current to the AC current source 501. The power modules 506 may provide the stored DC current and/or generated DC current to the AOM 502 may each be configured to control the amount of DC current provided to the IT device 514 via the DC/DC converter therein.

In various embodiments, AC current provided may be provided to the transformer 510 via the electrical distribution module 600. The transformer 510 may be configured to control the voltage of the incoming AC current provided to IT device 514, via various known means.

It is conceived that the system may include more or fewer electrical connectors 518, 520, IOMs 504, power modules 506, service PWM bays 508, AOMs 502, and IT devices 514, than the embodiments illustrated in FIG. 6 and described herein. For example, the system may include more than least one of each of the electrical connector 518, 520, the TOM 504, the power module 506, the service PWM bay 508, and the AOM 502, for each IT device 514.

In an non-limiting example, the IT device 514 may include multiple racked servers requiring 20 kW of DC current per rack. The power modules 506 may be able to generate power such that the output of the AOM 502 is 380V DC. In such an example, each power module of the groups of power module 506 may be configured to output 40 kW or 50 kW of DC current, or the group of power modules 506, may be configured to output 200 kW of DC current. The power output by the AOM 502 may be insufficient to meet the power requirements of the IT devices 514. To supplement the power needed to meet the power requirements of the IT devices 514, the standby power modules of the service PWM bay 508 may be activated to provide 50 kW of DC current, and/or the electrical connector 520 may be closed to receive current from the AC current source 501. The transformer 510 may be a three phase transformer rated at 500 kVA and for 480V primary and 480/277V secondary. The transformer 510 may output 227V AC to the IT device 514.

In various embodiments, the power modules 506 may be electrically connected to the IT devices 514 via the AOM 502. In various embodiments, individual ones or groups of the power modules 506 may be directly electrically connected to individual ones or groups of the IT devices 514. In the direct connection configuration, the power modules 506 may be configured to output current levels sufficient to power the directly connected IT devices 514.

In various embodiments, the power modules 506 may include an additional alternative energy generator, including combustion, photovoltaic, mechanical, and chemical generators, and/or energy storage devices. These additional energy sources may supplement the power of the power modules 506 as needed during a service event, for redundancy reasons, during concurrent maintenance, and for overload capacity. Each additional energy source may be incorporated into a single enclosure with one or more of the power modules 506. For example, the additional energy source may be enclosed in, mounted to, or extended through the enclosure.

In various embodiments, the power modules 506 may be in close proximity to the IT devices 514. Separate enclosures of the power modules 506 and the IT devices 514 may be located within the same room, building, and work or living site. In various embodiments, the power modules 506 and the IT devices 514 may be electrically and/or mechanically integrated within a single enclosure.

In various embodiments, the power modules 506, 506*a*, 506*b*, relating to the embodiments with reference to FIGS. 5 and 6, may produce exhaust containing $CO_2$ (carbon dioxide). The power modules 506, 506*a*, 506*b*, may be configured to separate the $CO_2$, from the exhaust by various known means, for example, as described in U.S. Pat. No. 9,190,685 which is incorporated herein by reference in its entirety, for other uses. In various embodiments, the power modules 506, 506*a*, 506*b*, may be fluidly connected to a natural gas well via an outlet conduit, such as gas or liquid piping or ducting. The separated $CO_2$ may be transferred via the outlet conduit into the natural gas well. The $CO_2$ may thereby be sequestered in the natural gas well for long term storage, and to limit the release of the $CO_2$ into the atmosphere. Further, the sequestered $CO_2$ may aid in the extraction of natural gas, such as $CH_4$ (methane), from the natural gas well for use as fuel by the power modules 506, 506a, 506b. The CO$_2$ may fill space within the natural gas well pushing the natural gas through an inlet conduit, such as gas or liquid piping or ducting, fluidly connecting the power modules 506, 506a, 506b, to the natural gas well. The power modules 506, 506a, 506b, may use the extracted natural gas as fuel to produce power for the IT devices 514, 514a, 514b.

In various embodiments, the power modules 506, 506a, 506b, may be fluidly connected to an algae farm via an outlet conduit, such as gas or liquid piping or ducting. The separated CO$_2$ may be transferred via the outlet conduit into the algae farm. The CO$_2$ may be used by the algae farm enhance algae growth and to produce biofuel, such as CH$_4$ (methane). The biofuel may be collected from the algae farm, for example, via an inlet conduit, such as gas or liquid piping or ducting, fluidly connecting the power modules 506, 506a, 506b, to the algae farm. The CO$_2$ may thereby be sequestered by absorption by the algae and conversion into biofuel. The power modules 506, 506a, 506b, may use the produced biofuel as fuel to produce power for the IT devices 514, 514a, 514b.

Various embodiments further include, operating a fuel cell system having a plurality of fuel cell segments and CO$_2$ separator. Operating a fuel cell system may include receiving a hydrocarbon fuel from a natural gas well or an algae farm at the fuel cell system, generating power using the hydrocarbon fuel, separating CO$_2$ from a fuel exhaust of the fuel cell segments using the CO$_2$ separator, and providing the separated CO$_2$ to the natural gas well or the algae farm.

The hydrocarbon fuel from the natural gas well or the algae farm may include natural gas from the natural gas well. The separated CO$_2$ may be sequestered in the natural gas well. The hydrocarbon fuel from the natural gas well or the algae farm may include methane from the algae farm. The separated CO$_2$ maybe absorbed by the algae at the algae farm to generate the methane.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

One or more block/flow diagrams have been used to describe exemplary embodiments. The use of block/flow diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Control elements may be implemented using computing devices (such as computer) comprising processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The preceding description of the disclosed embodiments is provided to enable any person skilled in the art to make or use the described embodiment. Various modifications to these embodiments will be readily apparent to those skilled in the art, and the generic principles defined herein may be applied to other embodiments without departing from the scope of the disclosure. Thus, the present invention is not intended to be limited to the embodiments shown herein but is to be accorded the widest scope consistent with the following claims and the principles and novel features disclosed herein.

What is claimed is:

1. A fuel cell system, comprising:
a power module comprising at least one fuel cell segment;
an input output module comprising at least one inverter;
an A-side output module (AOM) comprising a DC/DC converter;
a rectifier; and
an electric distribution module comprising at least a first electrical connector and a second electrical connector;
wherein:
the at least one fuel cell segment comprises a B-side output which is electrically connected to a direct current (DC) side of the at least one inverter;

the at least one fuel cell segment further comprises an A-side output which is electrically connected to an input of the AOM;

an output of the AOM is electrically connected to an information technology (IT) load via a split bus;

an alternating current (AC) side of the at least one inverter is electrically connected to an alternating current (AC) source via the first electrical connector of the electric distribution module; and the rectifier is electrically connected at an AC side to the AC source via the second electrical connector of the electric distribution module and is electrically connected at a DC side to the split bus between the output of the AOM and the IT load, such that the rectifier is electrically connected to the IT load via the split bus.

2. The system of claim 1, wherein the output of the AOM comprises an output of the DC/DC converter, and the DC/DC converter is electrically connected between the at least one fuel cell segment and the IT load.

3. The system of claim 2, further comprising a standby power module electrically connected between the at least one fuel cell segment and the DC/DC converter, and configured to be activated when the IT load does not receive sufficient power.

4. The system of claim 1, wherein:
the electric distribution module further comprises a third electrical connector electrically connected between the AC source and the first and second electrical connectors; and
the first, second, and third electrical connectors comprise breakers.

5. The system of claim 1, further comprising
a transformer electrically connected between the AC source and the rectifier;
a plurality of current flow control devices, wherein each of the plurality of current flow control devices is electrically connected to the split bus between the IT device and the power module or the transformer and are configured to prevent opposite polarity current flow on the split bus.

6. The system of claim 1, wherein:
the power module is configured to provide at least all necessary power to power the IT device; and
the AC source is configured to provide less than all necessary power to the IT device.

7. The system of claim 1, wherein the power module is fluidly connected to a natural gas well via an outlet conduit and a fuel inlet conduit, and configured to separate $CO_2$ from an exhaust produced by operation of the power module, to transfer the $CO_2$ to the natural gas well via the outlet conduit, and receive natural gas via the fuel inlet conduit.

8. The system of claim 1, wherein the power module is fluidly connected to an algae farm well via an outlet conduit and a fuel inlet conduit, and configured to separate $CO_2$ from an exhaust produced by operation of the power module, to transfer the $CO_2$ to the algae farm via the outlet conduit, and receive biofuel via the fuel inlet conduit.

9. A fuel cell system, comprising:
a power module comprising at least one fuel cell segment;
an input output module comprising at least one inverter;
a transformer; and
an electric distribution module comprising an output bus and at least a first electrical connector and a second electrical connector;

wherein:
the at least one fuel cell segment is electrically connected to the at least one inverter and is electrically connected to an information technology (IT) load via a first bus;

the at least one inverter is electrically connected at an alternating current (AC) side to a first end of the first electrical connector of the electric distribution module and is electrically connected to an alternating current (AC) source via the first electrical connector of the electric distribution module;

the transformer is electrically connected to a first end of the second electrical connector of the electric distribution module, is electrically connected to the AC source via the second electrical connector of the electric distribution module, and electrically connected to the IT load via a second bus, the output bus is electrically connected between a second end of the first electrical connector and a second end of the second electrical connector; and the AC source is electrically connected to the output bus between the second end of the first electrical connector and the second end of the second electrical connector.

10. The system of claim 9, further comprising an A-side output module (AOM) having a DC/DC converter, wherein the DC/DC converter is electrically connected between the at least one fuel cell segment and the IT load.

11. The system of claim 9, wherein:
the IT load is a dual corded IT load configured to receive DC power on an A-side of the IT load and AC power on a B-side of the IT load;
the power module is configured to provide at least all necessary power to power the IT device; and
the AC source is configured to provide at least all necessary power to the IT device.

12. The system of claim 9, wherein the power module is fluidly connected to a natural gas well via an outlet conduit and a fuel inlet conduit, and configured to separate $CO_2$ from an exhaust produced by operation of the power module, to transfer the $CO_2$ to the natural gas well via the outlet conduit, and receive natural gas via the fuel inlet conduit.

13. The system of claim 9, wherein the power module is fluidly connected to an algae farm well via an outlet conduit and a fuel inlet conduit, and configured to separate $CO_2$ from an exhaust produced by operation of the power module, to transfer the $CO_2$ to the algae farm via the outlet conduit, and receive biofuel via the fuel inlet conduit.

14. A fuel cell system, comprising:
a power module comprising a plurality of fuel cell segments;
a $CO_2$ separator for providing separated $CO_2$;
an input output module comprising at least one inverter;
an A-side output module (AOM) comprising a DC/DC converter;
a rectifier; and
an electric distribution module comprising at least a first electrical connector and a second electrical connector;
wherein:
the plurality of fuel cell segments are connected by a fuel input to a hydrocarbon fuel from a natural gas well or an algae farm at the fuel cell system, and are connected by a fuel exhaust to the $CO_2$ separator;
the plurality of fuel cell segments comprise a B-side output which is electrically connected to a direct current (DC) side of the at least one inverter;

the plurality of fuel cell segments further comprise an A-side output which is electrically connected to an input of the AOM;

an output of the AOM is electrically connected to an information technology (IT) load via a split bus;

the $CO_2$ separator is connected to the natural gas well or the algae farm for providing the separated $CO_2$ to the natural gas well or the algae farm;

an alternating current (AC) side of the at least one inverter is electrically connected to an alternating current (AC) source via the first electrical connector of the electric distribution module; and the rectifier is electrically connected at an AC side to the AC source via the second electrical connector of the electric distribution module and is electrically connected at a DC side to the split bus between the output of the AOM and the IT load, such that the rectifier is electrically connected to the IT load via the split bus.

\* \* \* \* \*